US007285783B2

(12) United States Patent
Yamaguchi et al.

(10) Patent No.: US 7,285,783 B2
(45) Date of Patent: Oct. 23, 2007

(54) MULTI-ANODE TYPE PHOTOMULTIPLIER TUBE AND RADIATION DETECTOR

(75) Inventors: Teruhiko Yamaguchi, Hamamatsu (JP); Suenori Kimura, Hamamatsu (JP); Minoru Suzuki, Hamamatsu (JP); Yoshitaka Nakamura, Hamamatsu (JP)

(73) Assignee: Hamamatsu Photonics K.K., Hamamatsu-shi (JP)

( * ) Notice: Subject to any disclaimer, the term of this patent is extended or adjusted under 35 U.S.C. 154(b) by 290 days.

(21) Appl. No.: 10/770,539

(22) Filed: Feb. 4, 2004

(65) Prior Publication Data

US 2004/0251417 A1 Dec. 16, 2004

Related U.S. Application Data

(60) Provisional application No. 60/477,361, filed on Jun. 11, 2003.

(51) Int. Cl.
*G01T 1/20* (2006.01)
*H01J 31/50* (2006.01)
*H01J 43/04* (2006.01)
*H01J 40/10* (2006.01)

(52) U.S. Cl. .............................. 250/367; 250/214 VT; 313/532; 313/540

(58) Field of Classification Search ................ 250/366, 250/367, 368; 313/532, 533, 540
See application file for complete search history.

(56) References Cited

U.S. PATENT DOCUMENTS 3,937,964 A * 2/1976 Muehllehner ............... 250/366
4,426,596 A * 1/1984 Butterwick ................. 313/534
4,649,276 A 3/1987 Suzuki
4,881,008 A * 11/1989 Kyushima et al. .......... 313/532
5,077,504 A 12/1991 Helvy
5,126,629 A 6/1992 Chopy
5,886,465 A * 3/1999 Muramatsu et al. ........ 313/533
6,020,684 A * 2/2000 Negi et al. .................. 313/544
6,472,664 B1 * 10/2002 Kyushima et al. .......... 250/366
6,852,979 B1 * 2/2005 Kyushima et al. .......... 250/366
2004/0251417 A1 * 12/2004 Yamaguchi et al. ........ 250/367

FOREIGN PATENT DOCUMENTS

JP A 57-194445 11/1982
JP 59014244 A * 1/1984
JP A 59-14244 1/1984

(Continued)

*Primary Examiner*—David Porta
*Assistant Examiner*—Faye Boosalis
(74) *Attorney, Agent, or Firm*—Oliff & Berridge, PLC

(57) ABSTRACT

A side tube includes a tube head, a funnel-shaped connection neck, and a tube main body, which are arranged along a tube axis and which are integrated together into the side tube. The size of a cross section of the tube head perpendicular to the tube axis is larger than the size of a cross section of the tube main body perpendicular to the tube axis. The radius of curvature of rounded corners of the tube head is smaller than the radius of curvature of rounded corners of the tube main body. The length of the tube head along the tube axis is shorter than the length of the tube main body along the tube axis. One surface of a faceplate is connected to the tube head. A photocathode is formed on the surface of the faceplate in its area located inside the tube head.

8 Claims, 11 Drawing Sheets

FOREIGN PATENT DOCUMENTS

| | | | |
|---|---|---|---|
| JP | A 61-83585 | | 4/1986 |
| JP | 63254652 A | * | 10/1988 |
| JP | A 2-291656 | | 12/1990 |
| JP | A 3-173056 | | 7/1991 |
| JP | A 5-93781 | | 4/1993 |
| JP | B2 6-27847 | | 4/1994 |
| JP | A 7-192686 | | 7/1995 |
| JP | A 9-72963 | | 3/1997 |
| JP | A 11-250853 | | 9/1999 |
| JP | A 2003-98262 | | 4/2003 |

* cited by examiner

COMPARATIVE EXAMPLE

FIRST EMBODIMENT

W2 > Wc
W2' > Wc'
R2 < Rc
R2' < Rc'

SECOND EMBODIMENT

W2 > Wc
W2' > Wc'
R2 < Rc
R2' < Rc'

COMPARATIVE EXAMPLE

FIRST EMBODIMENT

SECOND EMBODIMENT

MULTI-ANODE TYPE PHOTOMULTIPLIER TUBE AND RADIATION DETECTOR

CROSS-REFERENCE TO RELATED APPLICATION

This application claims benefit of Provisional application No. 60/477,361 filed on Jun. 11, 2003, the entire disclosure of which is herein incorporated by reference.

BACKGROUND OF THE INVENTION

1. Field of the Invention

The present invention relates to a multi-anode type photomultiplier tube and a radiation detector that employs the multi-anode type photomultiplier tube.

2. Description of the Related Art

Japanese unexamined patent application publication No. 05-93781 discloses a radiation detector 200 shown in FIG. 1. This radiation detector 200 includes a scintillator matrix 201 and a multi-anode type photomultiplier tube 203.

The scintillator matrix 201 includes a plurality of scintillators 202 that are arranged in a two-dimensional matrix manner. The scintillator matrix 201 generates and emits scintillation light in accordance with incident radiation. The multi-anode type photomultiplier tube 203 includes a plurality of anode electrodes, and detects scintillation light emitted from the scintillator matrix 201 by outputting output signals from the plurality of anode electrodes. By calculating a center of mass on the output signals from the anode electrodes, it is possible to identify which scintillator has emitted scintillation light.

Japanese unexamined patent application publication No. 11-250853 discloses a multi-anode type photomultiplier tube that is used for a radiation detector. This multi-anode type photomultiplier tube includes a faceplate and a quadrangular prismatic hollow side tube, both of which are made of glass. The side tube is connected to one surface of the faceplate, and extends along a tube axis that is substantially perpendicular to the faceplate. A photocathode is formed on the surface of the faceplate that is connected to the side tube. The photocathode is formed on the surface of the faceplate at its area that is located inside the side tube. The photocathode is for emitting photoelectrons in response to light incident on the faceplate. A plurality of electron multiplying units are provided inside the side tube in one-to-one correspondence with a plurality of regions defined on the photocathode. A plurality of anode electrodes are provided inside the side tube in one-to-one correspondence with the plurality of electron multiplying units.

Japanese unexamined patent application publication No. 03-173056 discloses a division-type photomultiplier tube. The photomultiplier tube has a side tube, which includes a quadrangular prismatic hollow tube head having a relatively large cross-sectional size and a quadrangular prismatic hollow tube main body having a relatively small cross-sectional size. The tube head is connected to one surface of a faceplate. A single anode electrode is provided inside the tube main body.

SUMMARY OF THE INVENTION

It is conceivable to modify the quadrangular-prism-shaped glass side tube described in Japanese unexamined patent application publication No. 11-250853 into a structure that includes a quadrangular-prism-shaped hollow tube head having a relatively large cross-section and a quadrangular-prism-shaped hollow tube main body having a relatively small cross-section, similar to the side tube described in Japanese unexamined patent application publication No. 03-173056. Because the cross-section of the tube head is large, it is possible to increase the size of the photocathode that is located on the faceplate at its area inside the side tube.

However, if the length of the tube head along the tube axial direction is longer than the length of the tube main body along the tube axial direction as disclosed in Japanese unexamined patent application publication No. 03-173056, the overall strength of the side tube will become insufficiently low.

When the quadrangular-prism-shaped hollow side tube is made of glass, the side tube will be curved or rounded at its four corners. This reduces the amount of the area on the faceplate that falls inside the corners of the side tube.

In the radiation detector, it is desirable that scintillation light from all the scintillators of the scintillator matrix is properly guided onto the photocathode substantially uniformly. It is noted that among all the scintillators in the scintillator matrix, there are some scintillators (corner-located scintillators) that are positioned in the scintillator matrix at a location that corresponds to the corners of the side tube. If the corners of the side tube are curved greatly, the incident efficiency from these corner-located scintillators becomes lower than the incident efficiency from other scintillators. Consequently, it is impossible to guide the scintillation light uniformly from all the scintillators in the scintillator matrix onto the photocathode.

An object of the present invention is therefore to solve the above-described problems and to provide a multi-anode type photomultiplier tube, which ensures that light effectively enters a photocathode and which has a high mechanical strength.

Another object of the present invention is to provide a radiation detector that includes the multi-anode type photomultiplier tube and that can detect scintillation light from all the scintillators in the scintillator matrix substantially uniformly.

In order to solve the above and other problems, the present invention provides a multi-anode type photomultiplier tube comprising: a faceplate made from glass and having a first surface and a second surface opposite to each other; a hollow side tube made from glass, the side tube extending along a tube axis that is substantially perpendicular to the faceplate, the side tube including: a tube main body having a substantially quadrangular prismatic hollow shape with four first corners, the tube main body extending along the tube axis by a first length, the tube main body having a first size of cross section substantially perpendicular to the tube axis, each first corner being curved with a first radius of curvature; a tube head having a substantially quadrangular prismatic hollow shape with four second corners, the tube head extending along the tube axis by a second length, the tube head having a second size of cross section substantially perpendicular to the tube axis, each second corner being curved with a second radius of curvature, the second length being shorter than the first length, the second size being larger than the first size, the second radius of curvature being smaller than the first radius of curvature, the tube head being connected to the first surface of the faceplate; and a funnel-shaped connection neck connecting the tube head to the tube main body coaxially along the tube axis; a photocathode that is provided on the first surface of the faceplate at its area inside the tube head and that emits photoelectrons in response to incidence of light on the faceplate from the second surface; a plurality of electron multiplying portions provided inside the tube main body in one-to-one correspondence with a plurality of regions on the photocathode; and a plurality of anode electrodes provided inside the tube main body in one-to-one correspondence with the plurality of electron multiplying portions.

According to another aspect, the present invention provides a multi-anode type photomultiplier tube comprising: a faceplate made from glass; a hollow side tube made from glass and joined to one main surface of the faceplate, the side tube extending along a tube axis that is substantially perpendicular to the faceplate; a photocathode that emits photoelectrons according to light incident on the faceplate, the photocathode being provided in an area inside the side tube on the one main surface of the faceplate; and a plurality of electron multiplying sections and a plurality of anode electrodes, which are provided inside the side tube and which correspond to a plurality of areas on the photocathode, the side tube including a tube head, a funnel-shaped connection neck, and a tube main body which are formed integrally with one another along the tube axis, the tube main body having a substantially quadrangular prismatic hollow shape with four first corners, the tube main body extending along the tube axis by a first length, the tube main body having a first size of cross section substantially perpendicular to the tube axis, each of the four first corners being curved with a first radius of curvature, the tube head having a substantially quadrangular prismatic hollow shape with four second corners, the tube head extending along the tube axis by a second length, the tube head having a second size of cross section substantially perpendicular to the tube axis, each of the four second corners being curved with a second radius of curvature, the second length being shorter than the first length, the second size being larger than the first size, the second radius of curvature being smaller than the first radius of curvature, the funnel-shaped connection neck connecting the tube head to the tube main body coaxially, the tube head being connected to the one main surface of the faceplate, the photocathode being provided on an area inside the tube head portion on the one main surface of the faceplate, and the plurality of electron multiplying sections and the plurality of anode electrodes being provided inside the tube main body.

According to another aspect, the present invention provides a radiation detector comprising: a scintillator matrix that includes a plurality of scintillators arranged in a two-dimensional matrix manner, each scintillator having an output surface, each scintillator generating scintillation light in accordance with radiation incident on the scintillator and emitting the scintillation light from the output surface; and a multi-anode type photomultiplier tube that detects the scintillation light emitted from each scintillator of the scintillator matrix, the multi-anode type photomultiplier tube including: a faceplate made from glass; a hollow side tube made from glass and joined to one main surface of the faceplate, the side tube extending along a tube axis that is substantially perpendicular to the faceplate, another main surface of the faceplate facing the output surfaces of all the plurality of scintillators in the sintillator matrix; a photocathode that emits photoelectrons according to sintillation light incident on the faceplate, the photocathode being provided on the one main surface of the faceplate at its area inside the side tube; and a plurality of electron multiplying units and a plurality of anode electrodes, which are provided inside the side tube and which correspond to a plurality of areas on the photocathode, the side tube including a tube head, a funnel-shaped connection neck, and a tube main body integrally along the tube axis, the tube main body having a substantially quadrangular prismatic hollow shape with four first corners, the tube main body extending along the tube axis by a first length, the tube main body having a first size of cross section substantially perpendicular to the tube axis, each of the four first corners being curved with a first radius of curvature, the tube head having a substantially quadrangular prismatic hollow shape with four second corners, the tube head extending along the tube axis by a second length, the tube head having a second size of cross section substantially perpendicular to the tube axis, each of the four second corners being curved with a second radius of curvature, the second length being shorter than the first length, the second size being larger than the first size, the second radius of curvature being smaller than the first radius of curvature, the funnel-shaped connection neck connecting the tube head to the tube main body coaxially, the tube head being joined to the one main surface of the faceplate, the photocathode being provided on the one main surface of the faceplate at its area inside the tube head, and the plurality of electron multiplying units and the plurality of anode electrodes being provided inside the tube main body.

BRIEF DESCRIPTION OF THE DRAWINGS

The particular features and advantages of the invention as well as other objects will become apparent form the following description taken in connection with the accompanying drawings in which.

DETAILED DESCRIPTION OF THE PREFERRED EMBODIMENTS

A multi-anode type photomultiplier tube and a radiation detector according to preferred embodiments of the present invention will be described with reference to the accompanying drawings.

First, a multi-anode type photomultiplier tube and a radiation detector of the first embodiment will be described with reference to FIGS. 2-11.

First, the multi-anode type photomultiplier tube of the present embodiment will be described below.

Figure 1:
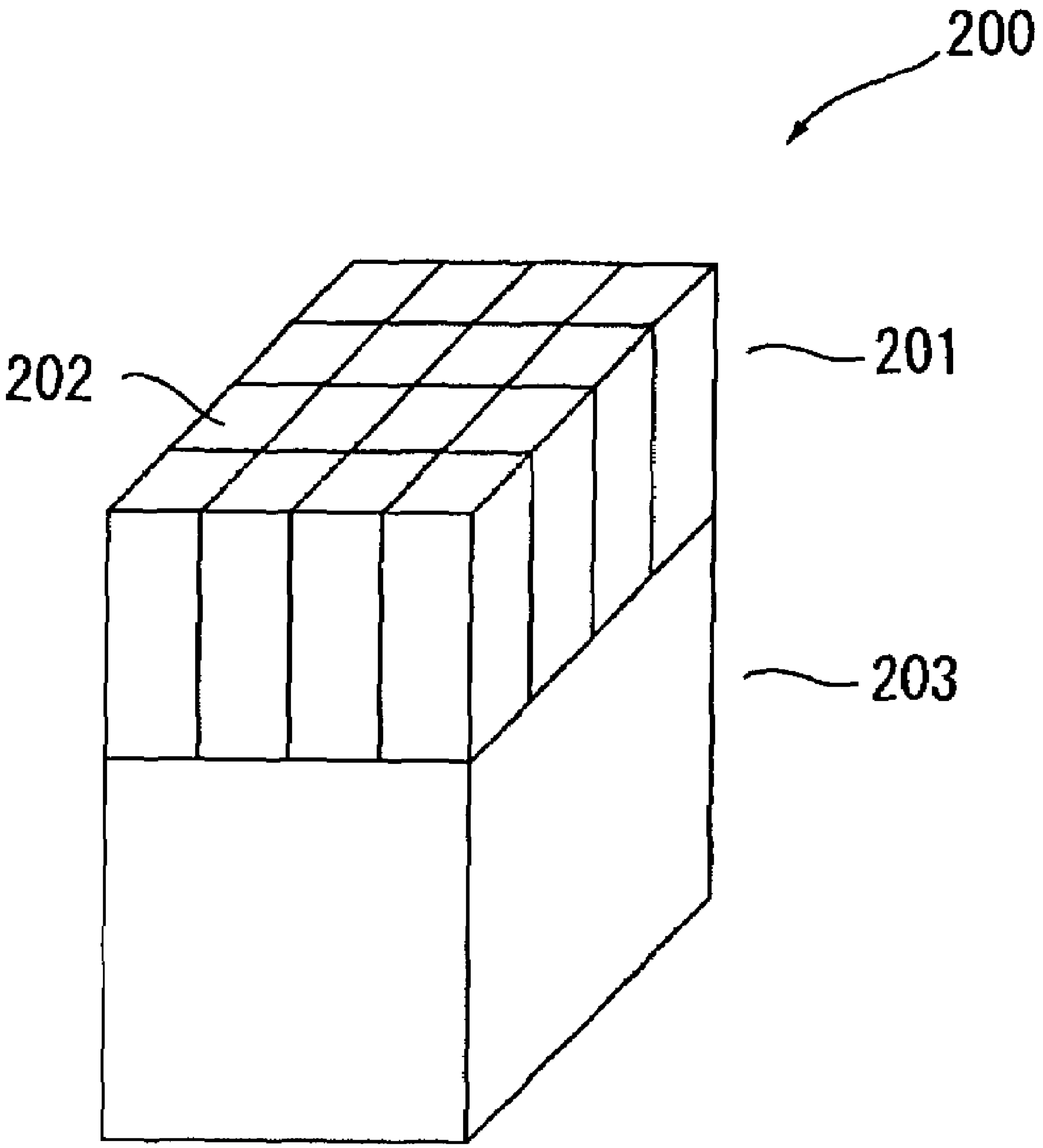
FIG. 1 is a perspective view of a conventional radiation detector.
Figure 2:
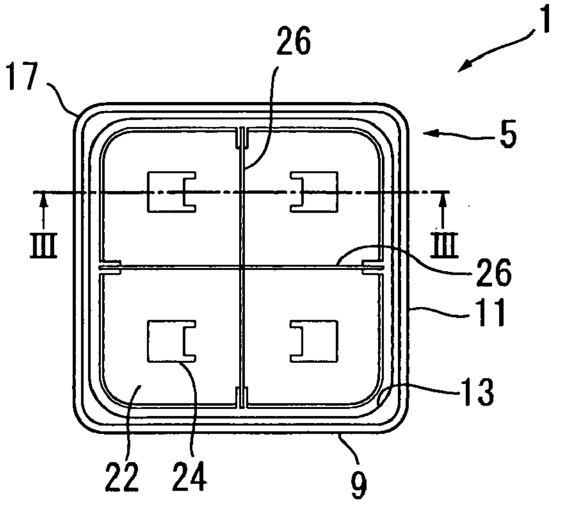
FIG. 2 is a plan view of a multi-anode type photomultiplier tube according to a first embodiment of the present invention.
Figure 3:
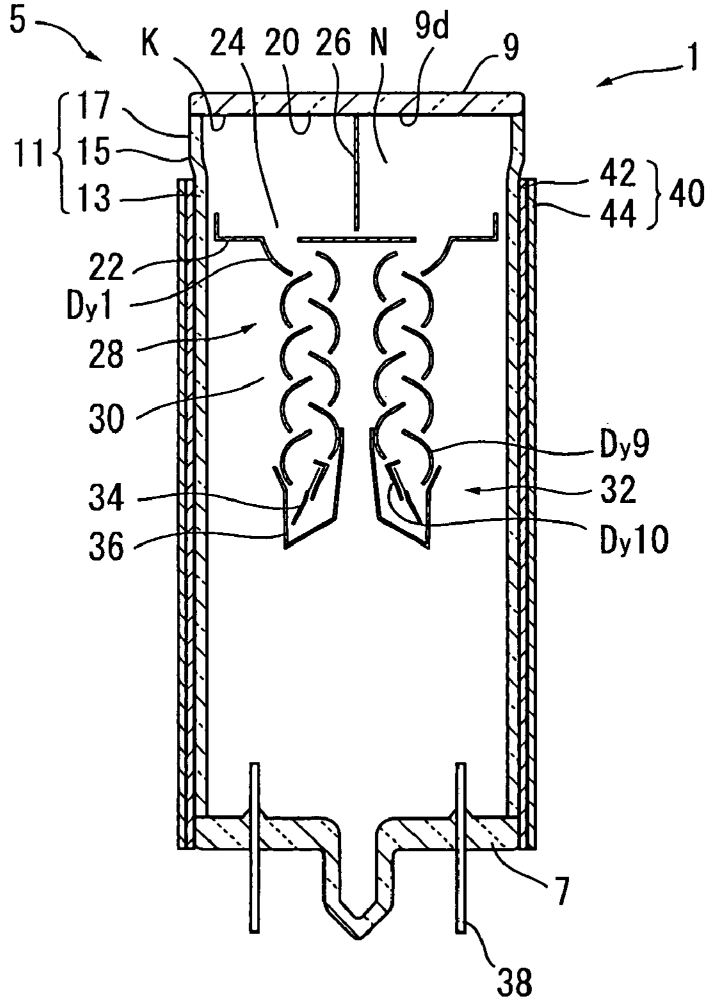
FIG. 3 is a sectional view of the multi-anode type photomultiplier tube taken along the line III-III of FIG. 2.

The multi-anode type photomultiplier tube 1 is of a two by two multi-anode type. As shown in FIGS. 2 and 3, the multi-anode type photomultiplier tube 1 includes a glass vessel 5 and a stem 7. The glass vessel 5 includes a hollow side tube 11 and a faceplate 9. The side tube 11 extends along a tube axis that is substantially perpendicular to the faceplate 9. All of the hollow side tube 11, the faceplate 9, and the stem 7 are made from transparent glass.

The side tube 11 includes a tube head 17, a funnel-shaped connection neck 15, and a tube main body 13. The tube head 17, the funnel-shaped connection neck 15, and the tube main body 13 are arranged along the tube axis in a direction along the tube axis. The tube head 17, the funnel-shaped connection neck 15, and the tube main body 13 are integrated together into the side tube 11.

As shown in FIG. 3, the upper end of the tube head 17 is connected to a lower surface 9*d* of the faceplate 9. An area of the lower surface 9*d* that is located inside the tube head 17 will be referred to as an "effective photoelectric area K" hereinafter. A photocathode 20 is formed over the effective photoelectric area K of the faceplate 9.

As also shown in FIG. 3, the lower end of the tube main body 13 is connected to the stem 7. The stem 7 hermetically seals the inside of the glass vessel 5. Input/output pins 38 pass through the stem 7.

A converging electrode plate 22 and four partition plates 26 are mounted in the glass vessel 5. The converging electrode plate 22 is of a plate shape, and is formed with four openings 24. The four openings 24 are arranged in a two by two matrix manner.

An electron multiplying section 28 and an anode section 32 are defined inside the glass vessel 5. Four dynode arrays 30 are provided in the electron multiplying section 28. Two dynode arrays 30 among the four dynode arrays 30 are shown in FIG. 3. Each dynode array 30 includes ten dynodes Dy1 to Dy10. Four anode electrodes 34 are provided in the anode section 32. Two anode electrodes 34 among the four anode electrodes 34 are shown in FIG. 3. Four shielding electrodes 36 are further provided in the anode section 32. Two shielding electrodes 36 among the four shielding electrodes 36 are shown in FIG. 3.

A magnetic shield 40 is mounted covering the outer periphery of the tube main body 13. The magnetic shield 40 includes a high magnetic permeability material layer 42 and a resin coating layer 44.

According to the present embodiment, the glass vessel 5 has such a shape that enables a large amount of light to effectively enter the photocathode 20 and that attains a high strength against a vacuum pressure.

The shape of the glass vessel 5 will be described below in greater detail with reference to FIGS. 4 to 8.

Figure 4:
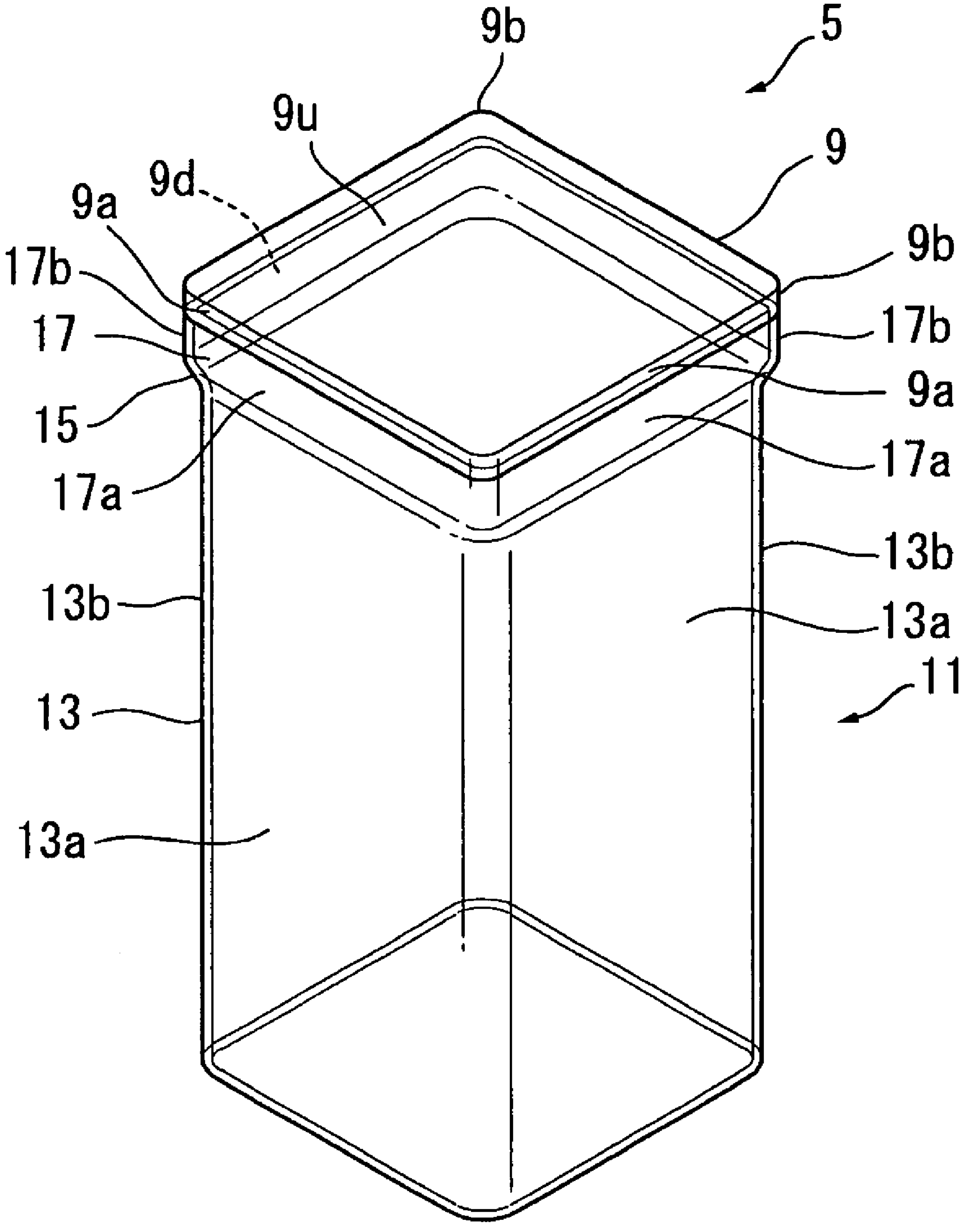
FIG. 4 is a perspective view of a glass vessel provided in the multi-anode type photomultiplier tube of the first embodiment.

As shown in FIG. 4, the faceplate 9 is of a substantially square plate shape. The faceplate 9 includes the lower surface 9*d*, an upper surface 9*u*, four side surfaces 9*a*, and four rounded or curved corners 9*b*. Both the upper surface 9*u* and the lower surface 9*d* are substantially of a square shape.

The tube head 17 has a substantially quadrangular prismatic hollow shape extending along the tube axis. The tube head 17 has a substantially square cross section perpendicular to the tube axis. The tube head 17 includes four planar sides 17*a* and four rounded or curved corners 17*b*. The planar sides 17*a* are continuously connected to the side surfaces 9*a* of the faceplate 9. The rounded corners 17*b* are continuously connected to the rounded corners 9*b* of the faceplate 9.

The tube main body 13 also has a substantially quadrangular prismatic hollow shape extending along the tube axis. The tube main body 13 has a substantially square cross section perpendicular to the tube axis. The tube main body 13 includes four planar sides 13*a* and four rounded or curved corners 13*b*.

The funnel-shaped connection neck 15 is provided between the tube head 17 and the tube main body 13 to continuously connect the tube head 17 and the tube main body 13 with each other. More specifically, the funnel-shaped connection neck 15 continuously connects the planar sides 17*a* of the tube head 17 to the planar sides 13*a* of the tube main body 13. The funnel-shaped connection neck 15 continuously connects the rounded corners 17*b* of the tube head 17 to the rounded corners 13*b* of the tube head 13.

Next, the shape and the size of the glass vessel 5 will be described in more detail with reference to FIGS. 5 to 8.

Figure 5:
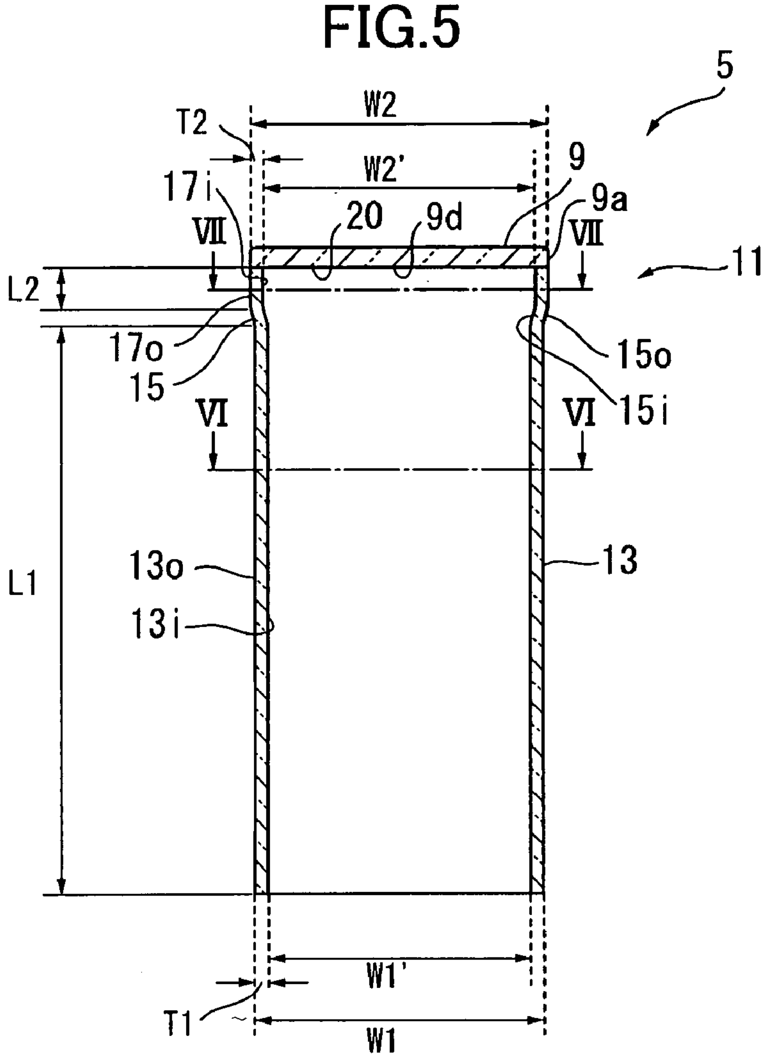
FIG. 5 is a sectional view of the glass vessel shown in FIG. 4.

As shown in FIG. 5, the tube head 17 includes an outer peripheral surface 17*o* and an inner peripheral surface 17*i*. The funnel-shaped connection neck 15 includes an outer peripheral surface 15*o* and an inner peripheral surface 15*i*. The tube main body 13 includes an outer peripheral surface 13*o* and an inner peripheral surface 13*i*.

The outer peripheral surface 17*o* is connected to the outer peripheral surface 13*o* via the outer peripheral surface 15*o*. The inner peripheral surface 17*i* is connected to the inner peripheral surface 13*i* via the inner peripheral surface 15*i*.

The tube main body 13 has a length L1 along the tube axis. The tube head 17 has a length L2 along the tube axis. The length L1 is longer than the length L2.

The tube head 17 has an outer width W2 and an inner width W2' in a direction perpendicular to the tube axis. The tube main body 13 has an outer width W1 and an inner width W1' in a direction perpendicular to the tube axis. The outer width W2 is larger than the outer width W1. The inner width W2' is larger than the inner width W1'. The faceplate 9 has an outer width that is equal to the outer width W2 of the tube head 17.

Figure 6:
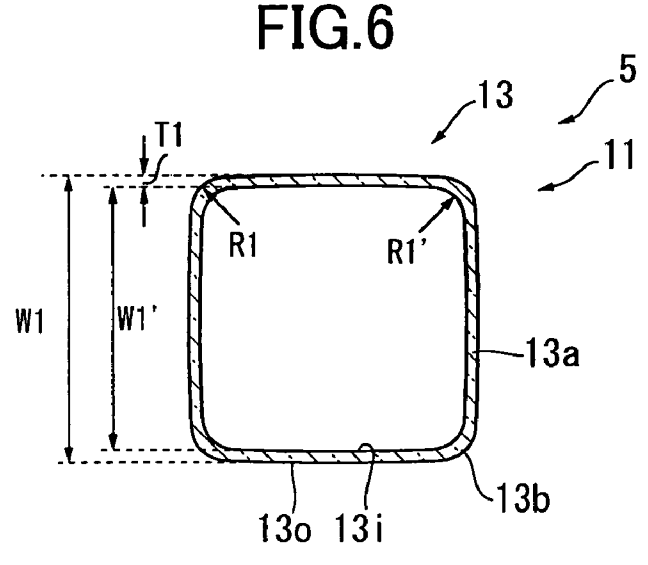
FIG. 6 is a cross-sectional view of a tube main body of the glass vessel that is taken along the line VI-VI of FIG. 5.

FIG. 6 is a cross-sectional view of the glass vessel 5 taken along the line VI-VI of FIG. 5. That is, FIG. 6 shows a cross-section of the tube main body 13. As shown in FIG. 6, the outer peripheral surface 13*o* connects each pair of adjacent rounded corners 13*b* in a substantially straight line. The outer width W1 is defined as a distance between each two adjacent rounded corners 13*b* along the outer peripheral surface 13*o*. The outer peripheral surface 13*o* is curved with a radius of curvature (outer radius of curvature) R1 at the rounded corners 13*b*.

The inner peripheral surface 13*i* extends substantially parallel with the outer peripheral surface 13*o*, while maintaining substantially fixed a distance between the inner and outer peripheral surfaces 13*i* and 13*o*. This distance will be referred to as a "thickness T1" of the tube main body 13 hereinafter. The inner peripheral surface 13*i* connects each pair of adjacent rounded corners 13*b* in a substantially straight line. The inner width W1' is defined as a distance between each two adjacent rounded corners 13*b* along the inner peripheral surface 13*i*. The inner width W1' has a value of (W1−2×T1). The inner peripheral surface 13*i* is curved with a radius of curvature (inner radius of curvature) R1' at the rounded corners 13*b*. The inner radius of curvature R1' is substantially equal to the outer radius of curvature R1.

Figure 7:
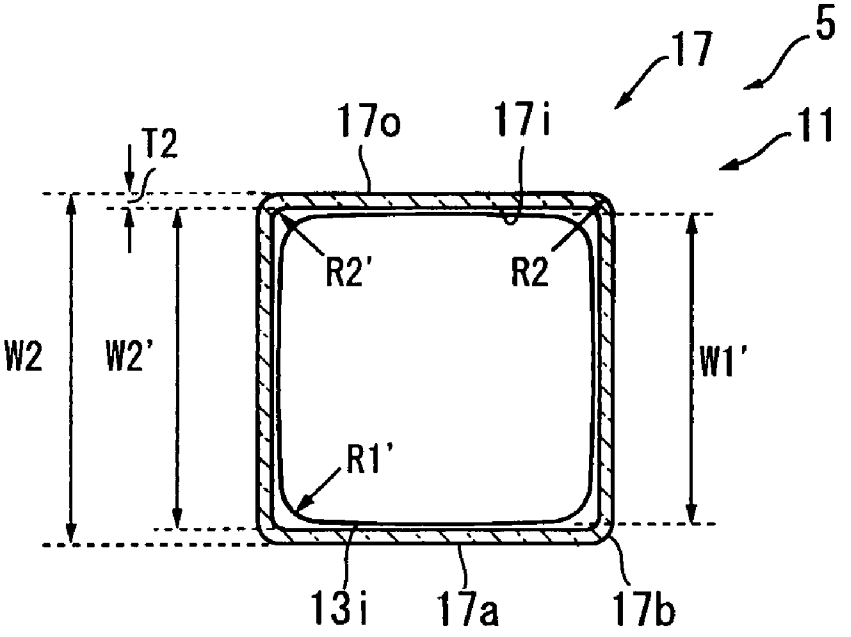
FIG. 7 is a cross-sectional view of a tube head of the glass vessel that is taken along the line VII-VII of FIG. 5.

FIG. 7 is a cross-sectional view of the glass vessel 5 taken along the line VII-VII of FIG. 5. That is, FIG. 7 shows a cross-section of the tube head 17. As shown in FIG. 7, the outer peripheral surface 17*o* connects each pair of adjacent rounded corners 17*b* in a substantially straight line. The outer width W2 of the tube head 17 is defined as a distance between each two adjacent rounded corners 17*b* along the outer peripheral surface 17*o*. The outer peripheral surface 17*o* is curved with a radius of curvature (outer radius of curvature) R2 at the rounded corners 17*b*. The outer radius of curvature R2 is smaller than the outer radius of curvature R1 of the tube main body 13.

The inner peripheral surface 17*i* extends substantially parallel with the outer peripheral surface 17*o*, while maintaining substantially fixed a distance between the inner peripheral surface 17*i* and the outer peripheral surface 17*o*. This distance will be referred to as a "thickness T2" of the tube head 17 hereinafter. The inner peripheral surface 17*i* connects each pair of adjacent rounded corners 17*b* in a substantially straight line. The inner width W2' is defined as a distance between the two adjacent rounded corners 17*b* along the inner peripheral surface 17*i*. The inner width W2' has a value of (W2−2×T2). The thickness T2 of the tube head 17 is substantially equal to the thickness T1 of the tube main body 13. The inner peripheral surface 17*i* is curved with a radius of curvature (inner radius of curvature) R2' at the rounded corners 17*b*. The inner radius of curvature R2' is substantially equal to the outer radius of curvature R2. Accordingly, the inner radius of curvature R2' is also smaller than the inner radius of curvature R1' of the tube main body 13.

Figure 8:
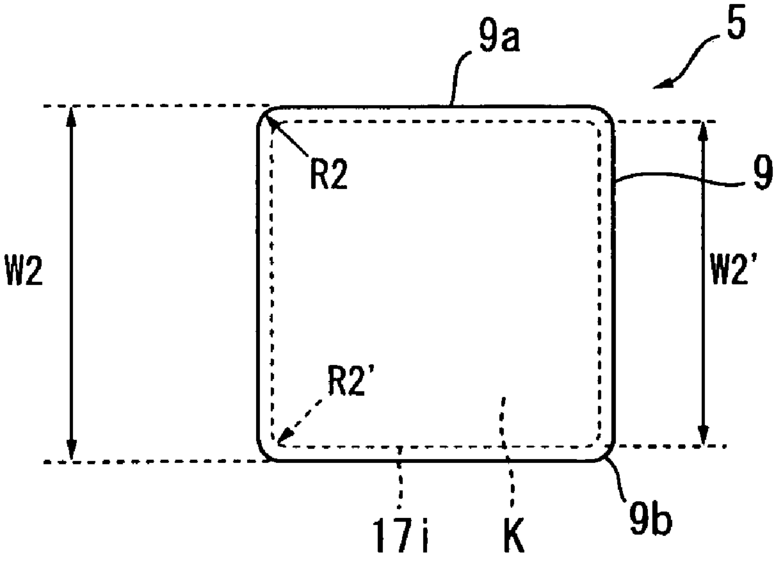
FIG. 8 is a top view of a faceplate of the glass vessel of FIG. 5.

FIG. 8 is a top view of the glass vessel 5 shown in FIG. 5. As shown in FIG. 8, the faceplate 9 has the same external shape and size as that of the cross-section of the tube head 17. That is, each pair of rounded corners 9*b* are connected by a corresponding side surface 9*a* in substantially a straight line. The distance between each pair of rounded corners 9*b* along the side surface 9*a* is equal to the outer width W2 of the tube head 17. The rounded corners 9*b* have the radius of curvature that is equal to the outer radius of curvature R2 of the rounded corners 17*b*. An area of the lower surface 9*d* of the faceplate 9 that is located as being surrounded by the inner peripheral surface 17*i* of the tube head 17 is defined as the effective photoelectric area K.

The side tube 11 having the above-described shape can be produced by first preparing an internal mold. The shape of the outer peripheral surface of the internal mold is identical to the shape of the inner peripheral surface of the side tube 11. Then, transparent glass (soft glass or hard glass or both) of a required thickness is supplied on the outer peripheral surface of the internal mold, thereby producing the side tube 11. Next, one surface (lower surface 9*d*) of the faceplate 9 is fused to the upper end of the tube head 17 in the side tube 11. As a result, the glass vessel 5 is produced.

Next, the internal construction of the multi-anode type photomultiplier tube 1 will be described in greater detail with referring back to FIGS. 2 and 3.

As described above, the photocathode 20 is formed on the effective photoelectric area K of the faceplate 9.

The converging electrode plate 22 faces the photocathode 20. The converging electrode plate 22 is for converging photoelectrons emitted from the photocathode 20 and for guiding the photoelectrons to the electron multiplying section 28. As described already, the converging electrode plate 22 has the two by two openings 24.

The photocathode 20 has two by two regions in one-to-one correspondence with the two by two openings 24. An electron converging space is defined between the photocathode 20 and the converging electrode plate 22. The partition plates 26 divide the electron converging space into two by two segment spaces N in one-to-one correspondence with the two by two openings 24.

Photoelectrons emitted from one region among the two-by-two regions of the photocathode 20 are converged by the converging electrode plate 22 while traveling in the corresponding segment space N. The photoelectrons then pass through the corresponding opening 24 to reach the electron multiplying section 28.

In the electron multiplying section 28, the four dynode arrays 30 are arranged in one-to-one correspondence with the four openings 24. Each dynode array 30 is of a line focus type, and includes the plurality of (ten, in this example) dynodes Dy1 to Dy10. The first- to tenth-stage dynodes Dy1 to Dy10 are arranged in the direction of the tube axis.

In the anode section 32, the four anode electrodes 34 are arranged in one-to-one correspondence with the four dynode arrays 30. Each anode electrode 34 is located between the ninth stage dynode Dy9 and the tenth stage dynode Dy10 in the corresponding dynode array 30. The four shielding electrodes 36 electrically isolate the four anode electrodes 34 from one another. Each anode electrode 34 receives photoelectrons that have been multiplied by the corresponding dynode array 30, and generates an output signal indicating the amount of the received photoelectrons.

The input/output pins 38 pass through the stem 7 and are fixed to the stem 7. The input/output pins 38 are connected via wirings (not shown) to the photocathode 20, the converging electrode plate 22, the electron multiplying section 28, and the anode section 32.

As described above, in this embodiment, the two by two dynode arrays 30 and the two by two anode electrodes 34 are provided in correspondence with the two by two segment spaces N. Each dynode array 30 receives photoelectrons emitted from a corresponding region of the photocathode 20 and multiplies the received photoelectrons. Then, the corresponding anode electrode 34 receives the multiplied photoelectrons, and generates an output signal indicating the amount of the received photoelectrons. The output signal is outputted through the input/output pins 38.

In the side tube 11, the partition plates 26 extend across the tube head 17 and the funnel-shaped connection neck 15 into the tube main body 13. The converging electrode plate 22, the electron multiplying section 28, and the anode section 32 are provided in the tube main body 13. The magnetic shield 40 shields the converging electrode plate 22, the electron multiplying section 28, and the anode section 32 in the tube main body 13 from an external magnetic field. The high magnetic permeability material layer 42 is made of permalloy, for instance, and directly covers the outer periphery of the tube main body 13. The resin coating layer 44 covers the outer periphery of the high magnetic permeability material layer 42. The resin coating 44 fixes the high magnetic permeability material layer 42 to the photomultiplier tube 1.

With the above-described configuration, the multi-anode type photomultiplier tube 1 operates as will be described below.

Predetermined voltages are applied to the photocathode 20, the converging electrode plate 22, the dynodes Dy1-Dy10, and the anode electrodes 34 through the input/output pins 38. When light is incident on an area of the faceplate 9 that corresponds to one segment space N, photoelectrons whose amount corresponds to the amount of the incident light are emitted from the corresponding area of the photocathode 20. These photoelectrons are converged by the converging electrode plate 22 while traveling in the segment space N, and are then guided through the corresponding opening 24 into the corresponding dynode array 30. The photoelectrons are multiplied at the successive stages of the dynodes Dy1-Dy10, and are then collected by the corresponding anode electrode 34. The photoelectrons thus collected by the anode electrode 34 are outputted as an output signal through the input/output pins 38. This output signal indicates the amount of light that originally impinges the area of the faceplate 9 that faces the segment space N.

In this embodiment, the converging electrode plate 22, the electron multiplying section 28, and the anode section 32 are placed in the tube main body 13. The magnetic shield 40 is provided on the outer periphery of the tube main body 13. Therefore, the convergence and multiplication of photoelectrons are performed precisely without being affected by an external magnetic field.

In the multi-anode type photomultiplier tube 1 of this embodiment, as shown in FIG. 5, the outer widths W2 of the tube head 17 and of the faceplate 9 are larger than the outer width W1 of the tube main body 13. The inner width W2' of the tube head 17 is larger than the inner width W1' of the tube main body 13. It is possible to increase the size of the effective photoelectric area K and the size of the photocathode 20 in comparison with the case where the outer width W2 is equal to the outer width W1 and the inner width W2' is equal to the inner width W1'. This ensures that a large part of light that impinges the faceplate 9 enters the photocathode 20 to be properly converted into photoelectrons.

Additionally, as shown in FIG. 7, the inner radius of curvature R2' of the rounded corners **17*b* in the tube head 17 is smaller than the inner radius of curvature R1' of the rounded corners 13*b* in the tube main body 13. The outer radius of curvature R2 of the rounded corners 17*b* is smaller than the outer radius of curvature R1 of the rounded corners 13*b*. Therefore, it is possible to further increase the size of the effective photoelectric area K in the vicinity of the rounded corners 17*b*. It is possible to increase the size of the photocathode 20 in the vicinity of the rounded corners 17*b*. This ensures that light reaching the vicinity of the rounded corners 9*b* of the faceplate 9 enters the photocathode 20** effectively.

Because the tube head 17 has a large cross-sectional size and has a small radius of curvature at the rounded corners **17*b*, the tube head 17 has a relatively small mechanical strength. However, this tube head 17 is supported by the tube main body 13 that has a small cross-sectional size and that has a large radius of curvature at the rounded corners 13*b*. This structure enhances the overall strength of the side tube 11. In addition, the length L1 of the tube main body 13 in the tube axial direction is longer than the length L2 of the tube head 17 in the tube axial direction. The overall strength of the side tube 11** is further enhanced.

As described above, the cross-sectional size of the tube head 17 perpendicular to the tube axis is larger than the cross-sectional size of the tube main body 13 perpendicular to the tube axis. The radiuses of curvature of the rounded corners **17*b* are smaller than the radiuses of curvature of the rounded corners 13*b*. The length of the tube head 17 along the tube axis is shorter than the length of the tube main body 13 along the tube axis. Therefore, the overall mechanical strength of the side tube 11 can be enhanced sufficiently: by setting the cross-sectional size of the tube head 17 and the radiuses of curvature of the rounded corners 17*b* to desired values according to application of the photomultiplier tube 1; and by adjusting the lengths of the tube main body 13 and the tube head 17, the cross-sectional size of the tube main body 13, and the radiuses of curvature of the rounded corners 13*b* according to the cross-sectional size of the tube head 17 and the radiuses of curvature of the rounded corners 17*b***.

Next, a radiation detector 50 of the first embodiment will be described with reference to FIGS. 9 to 11.

Figure 9:
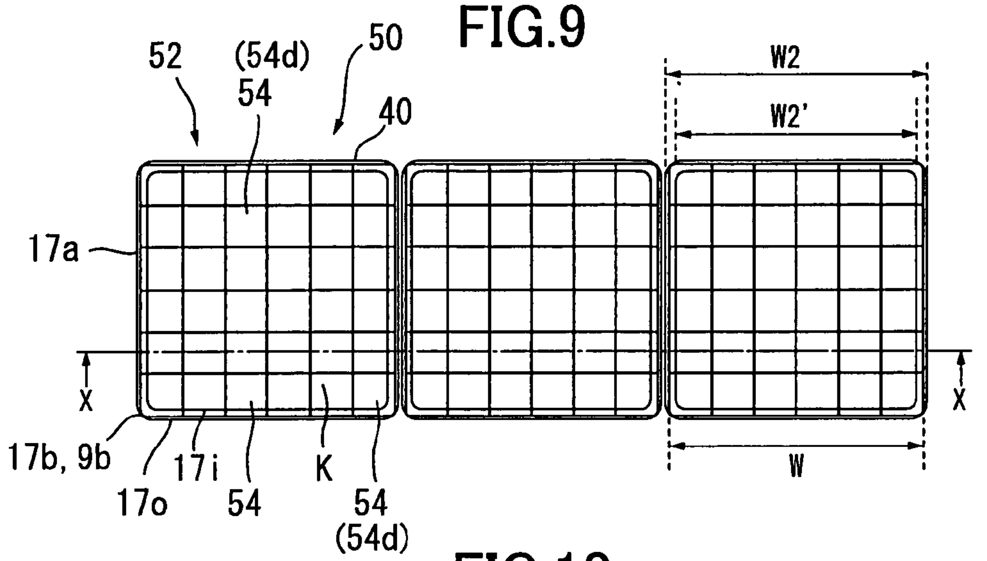
FIG. 9 is a schematic plan view showing an arrangement, in which several radiation detectors of a first embodiment of the present invention are arranged.

As shown in FIG. 9, several radiation detectors 50 (three radiation detectors in this example) of this embodiment are arranged adjacent to one another one-dimensionally.

Figure 10:
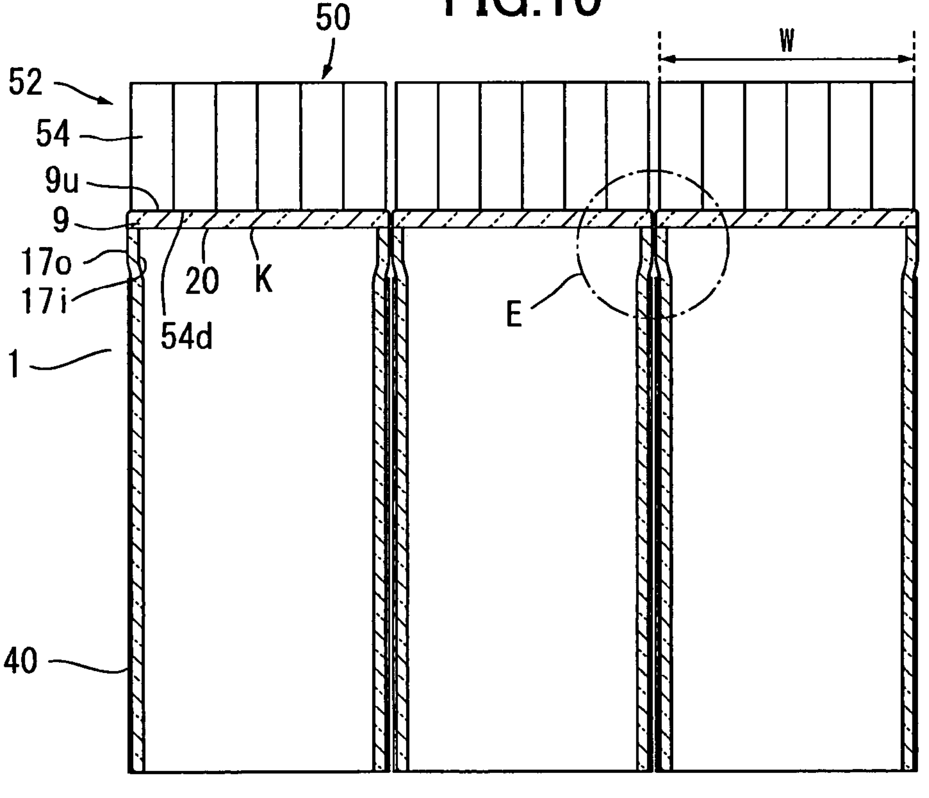
FIG. 10 is a sectional view taken along the line X-X of FIG. 9.
Figure 11:
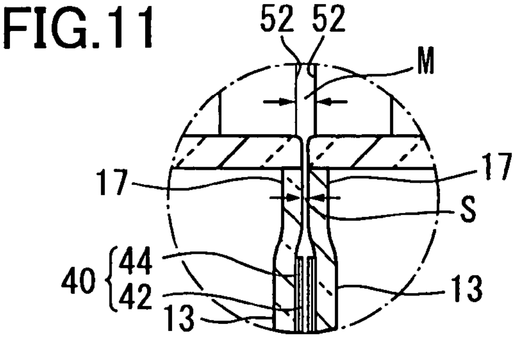
FIG. 11 is an enlarged view of a portion E shown in FIG. 10.

As shown in FIG. 10, each radiation detector 50 includes the multi-anode type photomultiplier tube 1 of the present embodiment and a scintillator matrix 52. The multi-anode type photomultiplier tube 1 has the construction described with reference to FIGS. 2 and 3. In FIG. 10, the illustration of the internal construction of the multi-anode type photomultiplier tube 1 is omitted for clarification purposes.

The scintillator matrix 52 generates scintillation light in accordance with radiation incident thereon. As shown in FIGS. 9 and 10, the scintillator matrix 52 is formed by arranging a plurality of scintillators 54 (thirty-six scintillators 54 in this example) in a six by six matrix manner. Each scintillator 54 has a rectangular prismatic shape having a substantially square cross section. Each scintillator 54 has a substantially square output surface (lower surface in FIG. 10) 54*d*. When one scintillator 54 receives incident radiation from outside, the scintillator 54 generates scintillation light whose amount corresponds to the amount of the incident radiation and emits the scintillation light from the output surface 54*d* as scattered light.

The multi-anode type photomultiplier tube 1 is combined with the scintillator matrix 52 with the upper surface 9*u* of the faceplate 9 confronting and being bonded to the output surfaces 54*d* of all the scintillators 54 in the scintillator matrix 52. FIG. 9 schematically shows a positional relationship between the effective photoelectric area K of the multi-anode type photomultiplier tube 1 and the output surfaces 54*d* of the thirty-six scintillators 54. Among all the thirty-six scintillators 54, some scintillators (which will be referred to as “periphery-located scintillators” hereinafter) 54, which are positioned on the outer periphery of the scintillator matrix 52, face the outer periphery of the tube head 17 through the outer periphery of the faceplate 9. Among the periphery-located scintillators 54, four scintillators (which will be referred to as “corner-located scintillators” hereinafter) 54 are located on the four corners of the scintillator matrix 52. Each corner-located scintillator 54 faces the corresponding rounded corner 17*b* of the tube head 17 through the corresponding rounded corner 9*b* of the faceplate 9.

When several radiation detectors 50 are arranged adjacent with one another as shown in FIGS. 9 and 10, the tube heads 17 have to be spaced away from each other by at least a minimum distance S in order to prevent the tube heads 17 from colliding with one another and from being damaged.

The scintillator matrix 52 has a width W as shown in FIGS. 9 and 10. The magnetic shield 40 has a thickness M that is larger than the minimum distance S. The outer width W1 of the tube main body 13 is equal to the width W of the scintillator matrix 52. The outer widths W2 of the faceplate 9 and of the tube head 17 are therefore larger than the width W of the scintillator matrix 52. The difference between the width W2 and the width W (=W1) is equal to a value of (M−S). The inner width W2' of the tube head 17 is smaller than the outer width W2 of the tube head 17 by twice of the thickness T2. It is now assumed that the value “2×T2” is slightly larger than the value (M−S). Accordingly, the inner width W2' is slightly smaller than the width W of the scintillator matrix 52.

In this example, the radiation detectors 50 are arranged with the magnetic shields 40 of each two adjacent radiation detectors 50 contacting with each other. Accordingly, as shown in FIG. 11, the tube heads 17 are spaced away from each other by a distance equal to the minimum distance S. The scintillator matrixes 52 are spaced away from each other by a distance that is equal to the thickness M of the magnetic shield 40.

Further, the outer sizes W2 of the faceplate 9 and of the tube head 17 are greater than the size W of the scintillator matrix 52. The inner size W2' of the tube head 17 is slightly smaller than the size W of the scintillator matrix 52. Accordingly, as shown in FIG. 9, the almost entire part of the output surface 54*d* of each periphery-located scintillator 54 faces the effective photoelectric area K that is located inside the tube head 17.

Additionally, the radiuses of curvature R2 and R2' at the rounded corners 17*b* have relatively small values. Accordingly, the almost entire part of the output surface 54*d* of each corner-located scintillator 54 faces the effective photoelectric area K.

According to the present embodiment, when it is desired to increase the total number of the scintillators 54 in the scintillator matrix 52, for example, in order to increase the area of the photocathode 20 by the outer and inner sizes W2 and W2' of the tube head 17 are increased and the radiuses of curvature R2 and R2' of the rounded corners 17*b* are set to desired values. Then, in order to maintain the strength of the entire side tube 11, the length L2 of the tube head 17, and the length L1, the sizes W1 and W1', and the radiuses of curvature R1 and R1' of the tube main body 13 are adjusted in accordance with the set values W2, W2', R2, and R2'. Accordingly, it is possible to enhance the overall strength of the side tube 11. It is possible to increase the area of the photocathode 20 to allow scintillation light that is emitted from the scintillator matrix 52 at its portions in the vicinity of the rounded corners 17*b* to effectively enter the photocathode 20.

With the above-described configuration, the radiation detector 50 operates as described below.

When radiation (gamma rays) falls incident on one scintillator 54 in one radiation detector 50, the scintillator 54 generates scintillation light. The scintillation light is emitted from the output surface 54*d* of the scintillator 54, impinges on the faceplate 9 as scattered light, and is converted into photoelectrons by the photocathode 20. The photoelectrons are multiplied by the electron multiplying section 28, and are then outputted as four output signals from the anode section 32. Although not shown in the drawings, a calculating apparatus such as a computer receives the four output signals and calculates a center of mass on the four output signals, thereby obtaining ratios between these output signals. Based on the result of the calculation, the calculating apparatus identifies the one scintillator 54 that has received radiation. Because the plurality of radiation detectors 50 are arranged adjacent to one another at a regular interval, it is possible to detect a distribution of incident positions of radiation over a wide area.

The outer and inner sizes W2 and W2' of the tube head 17 are relatively large. This enables the almost entire part of the output surface 54*d* of each periphery-located scintillator 54 to properly face the photocathode 20 that is located inside the tube head 17.

Additionally, the radiuses of curvature (outer and inner radiuses of curvature R2 and R2') of the rounded corners 17*b* of the tube head 17 are relatively small. This enables the almost entire part of the output surface 54*d* of each corner-located scintillator 54 to face the photocathode 20 that is located inside the rounded corners 17*b* of the tube head 17.

Thus, it is ensured that the almost entire part of output light that emits from each periphery-located scintillator 54 enters the photocathode 20. It is noted that the entire part of output light that emits from each center-located scintillator 54, that is positioned in the central part of the scintillator matrix 52, enters the photocathode 20. Accordingly, the photocathode 20 receives scintillation light from all the scintillators 54 substantially uniformly. This attains detection of radiation with a uniform sensitivity.

The magnetic shield 40 with the thickness M is provided on the outer periphery of the tube main body 13, whose outer size is smaller than that of the tube head 17. It is therefore possible to increase the outer size W2 of the tube head 17 up to a sum of the outer size W1 of the tube main body 13 and the thickness M of the magnetic shield 40. It is possible to increase the size of the photocathode 20. Additionally, the side tube 11 mounted with the magnetic shield 40 has entirely a substantially flat lateral side, and is easy for handling.

Second Embodiment

A multi-anode type photomultiplier tube and a radiation detector according to a second embodiment of the present invention will be described below with reference to FIGS. 2-6, 8, and 12.

The multi-anode type photomultiplier tube of the second embodiment (which will be referred to as "multi-anode type photomultiplier tube 1'," hereinafter) has a tube head (which will be referred to as "tube head 17'," hereinafter), whose cross-section is different from that of the tube head 17 of the first embodiment. The tube head 17' has a cross-section shown in FIG. 12.

Except for the tube head 17', the multi-anode type photomultiplier tube 1' has substantially the same configuration as that of the multi-anode type photomultiplier tube 1 shown in FIGS. 2 and 3. More specifically, the multi-anode type photomultiplier tube 1' has a glass vessel (which will be referred to as "glass vessel 5'," hereinafter). The glass vessel 5' has: an external shape substantially the same as that of the glass vessel 5 shown in FIG. 4; a section substantially the same as that of the glass vessel 5 shown in FIG. 5; and a top profile substantially the same as that of the glass vessel 5 shown in FIG. 8. In other words, the glass vessel 5' is the same as the glass vessel 5 of the first embodiment except that the glass vessel 5' has a side tube (which will be referred to as "side tube 11'," hereinafter) instead of the side tube 11. The side tube 11' is the same as the side tube 11 of the first embodiment except that the side tube 11' has the tube head 17' instead of the tube head 17. The glass vessel 5' therefore includes the faceplate 9 and the side tube 11', which includes the tube head 17', the funnel-shaped connection neck 15, and the tube main body 13. The tube main body 13 has the cross-section shown in FIG. 6.

The radiation detector (which will be referred to as "radiation detector 50'," hereinafter) of the present embodiment is the same as the radiation detector 50 of the first embodiment, which has been described with reference to FIGS. 9-11, except that the radiation detector 50' employs the multi-anode type photomultiplier tube 1' of the present embodiment.

Figure 12:
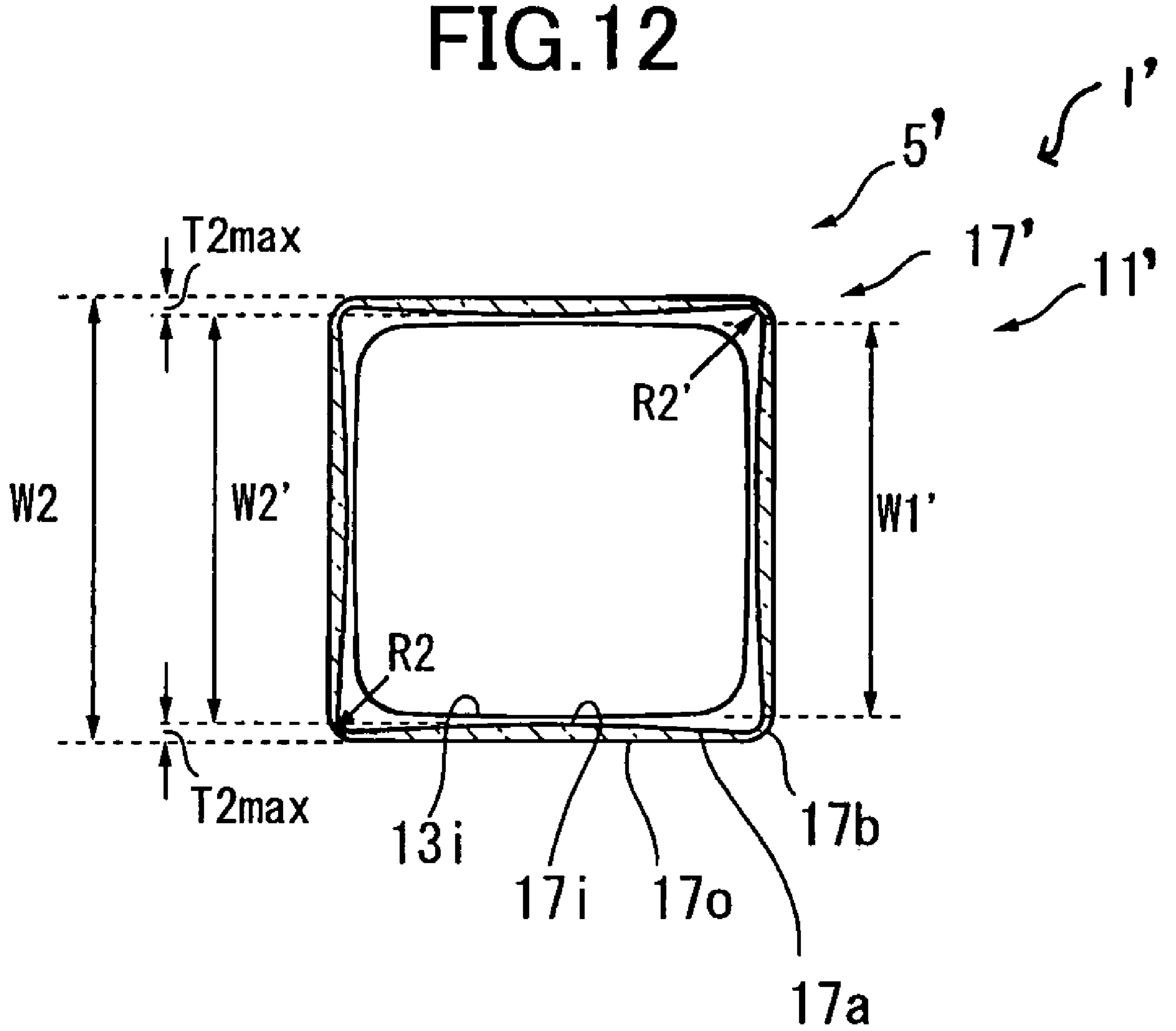
FIG. 12 is a cross-sectional view of a tube head according to a second embodiment.

Next will be described the tube head 17' of the present embodiment in more detail with reference to FIG. 12.

The tube head 17' is the same as the tube head 17 of FIG. 7 except that the inner peripheral surface **17*i* connects each two adjacent rounded corners 17*b* in a curved manner, thereby allowing the tube head 17' to have a pin-cushion shaped cross-section. In other words, the cross-section of the tube head 17' is thinning toward each rounded corner 17*b* as shown in FIG. 12**.

It is noted that the tube head 17' has the same external shape as the tube head 17 of FIG. 7. That is, the outer peripheral surface **17*o* connects each two adjacent rounded corners 17*b* in a substantially linear manner. The outer width W2 of the tube head 17' is therefore defined along the outer peripheral surface 17*o* between each two adjacent corners 17*b*. The outer peripheral surface 17*o* is curved at each rounded corner 17*b* with the radius of curvature (outer radius of curvature) R2. The outer width W2 is greater than the outer width W1 of the tube main body 13. The radius of curvature R2 is smaller than the radius of curvature R1 at the rounded corners 13*b* in the tube main body 13**.

In the tube head 17' of the present embodiment, the inner peripheral surface **17*i* is spaced the farthest from the outer peripheral surface 17*o* at a midpoint or center position between each two adjacent rounded corners 17*b*. The inner peripheral surface 17*i* gradually approaches the outer peripheral surface 17*o* as approaching toward each rounded corner 17*b*. Therefore, the distance between the inner peripheral surface 17*i* and the outer peripheral surface 17*o* (thickness of the tube head 17') has the maximum value T2 max at the midpoint between each two adjacent rounded corners 17*b*. The distance between the inner peripheral surface 17*i* and the outer peripheral surface 17*o* (thickness of the tube head 17') gradually reduces as approaching toward each rounded corner 17*b***.

According to the present embodiment, the inner width W2' of the tube head 17' is defined as equal to the amount of (W2−2×T2max). It is noted that the amount of the maximum thickness T2max is substantially equal to the amount of the thickness T1 of the tube main body 13. The inner width W2' of the tube head 17' is therefore larger than the inner width W1' of the tube main body 13. It is additionally noted that the amount of the maximum thickness T2max is substantially equal to the amount of the thickness T2 (FIG. 7) of the tube head 17 in the first embodiment. Accordingly, the amount of the inner width W2' of the tube head 17' in the present embodiment is substantially equal to the amount of the inner width W2' of the tube head 17 of the first embodiment.

The thickness of the tube head 17' gradually reduces from the midpoint between the two adjacent corners **17*b* toward the corners 17*b*. Accordingly, in the tube head 17', the inner peripheral surface 17*i* is curved at the rounded corners 17*b* with a radius of curvature (inner radius of curvature) R2' whose value is smaller than that of the outer radius of curvature R2. The value of the inner radius of curvature R2' is therefore smaller than the value of the inner radius of curvature R1' in the tube main body 13**.

In order to produce the side tube 11' having the above-described cross-section, an external mold is prepared. The external mold has an inner peripheral surface whose shape is identical to the shape of the outer periphery of the side tube 11'. The side tube 11' can be produced by injecting glass (soft glass or hard glass or both) into the external mold so that glass is provided on the inner peripheral surface of the external mold with a desired thickness.

According to the multi-anode type photomultiplier tube 1' of the present embodiment, it is possible to further increase the area in the vicinity of the rounded corners **17*b* on the effective photoelectric area K compared with the multi-anode type photomultiplier tube 1 of the first embodiment. This ensures that light reaching the vicinity of the rounded corners 17*b* will enter the photocathode 20 more effectively. The radiation detector 50' of the present embodiment ensures that the almost entire part of the output surface 54*d* of each corner-located scintillator 54 faces the photocathode 20. Photoelectric conversion of scintillation light from all the scintillators 54** can be performed almost uniformly, and radiation can be detected with almost uniform sensitivity.

Next will be described a multi-anode type photomultiplier tube 101 of a comparative example with reference to FIGS. 13 and 14.

Figure 13:
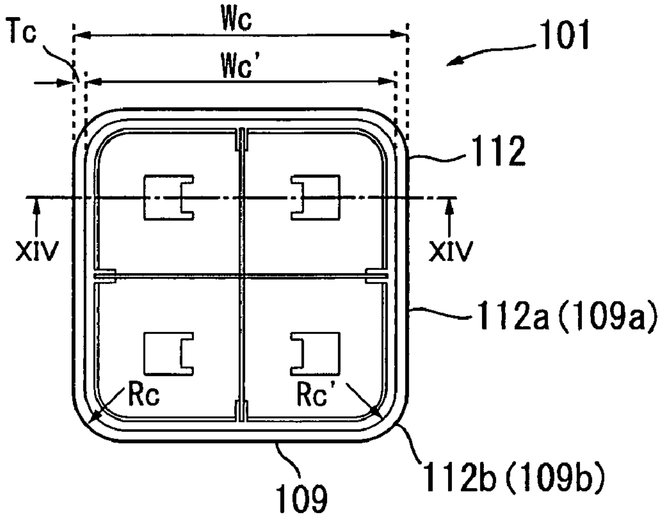
FIG. 13 is a plan view of a multi-anode type photomultiplier tube according to a comparative example.
Figure 14:
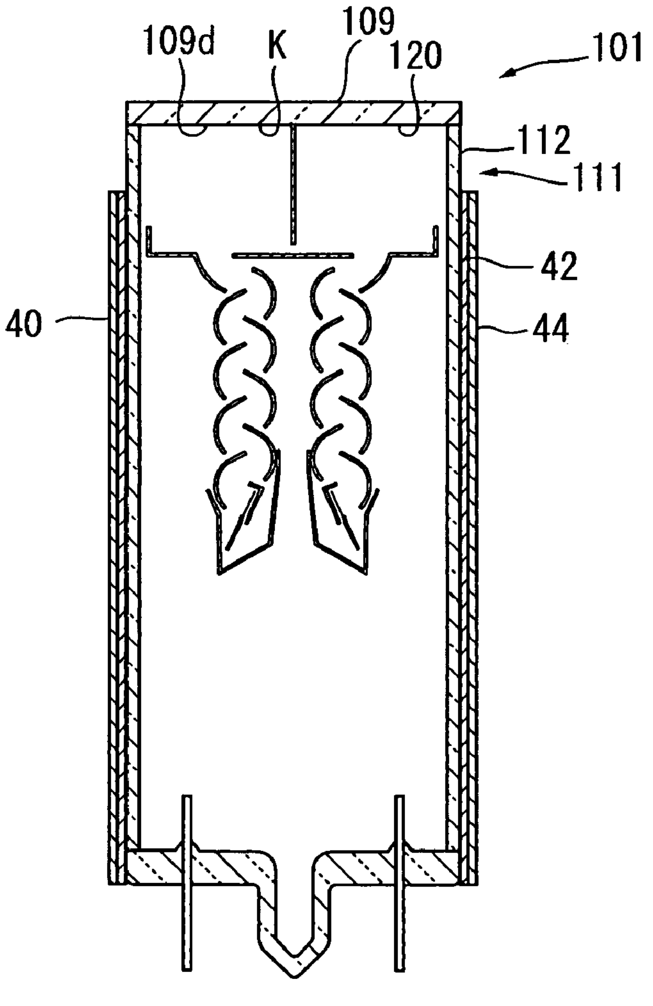
FIG. 14 is a sectional view of the multi-anode type photomultiplier tube of the comparative example taken along the line XIV-XIV of FIG. 13.

As shown in FIGS. 13 and 14, the multi-anode type photomultiplier tube 101 of the comparative example is the same as the multi-anode type photomultiplier tube 1 of the first embodiment except that the multi-anode type photomultiplier tube 101 has a side tube 111 and a faceplate 109. The side tube 111 is formed only of a single tube 112. The tube 112 is joined to a lower surface 109*d* of the faceplate 109. The tube 112 has a quadrangular prismatic hollow shape similar to the tube main body 13 of the first embodiment.

As shown in FIG. 13, a cross section of the tube 112 perpendicular to the tube axis is substantially square. The tube 112 includes four planar sides 112*a* and four rounded or curved corners 112*b*. The tube 112 has a substantially uniform thickness. The tube 112 has an outer width Wc, a thickness Tc, and an inner width Wc' (=Wc−2×Tc). The rounded corners 112*b* have an outer radius of curvature Rc and an inner radius of curvature Rc'. The amount of the outer radius of curvature Rc is substantially equal to the amount of the inner radius of curvature Rc'. The amount of the outer size Wc is smaller than that of the outer size W2 of the tube head 17 in the first embodiment and that of the outer size W2 of the tube head 17' in the second embodiment. The amount of the inner size Wc' is smaller than that of the inner size W2' of the tube head 17 in the first embodiment and that of the inner size W2' of the tube head 17' in the second embodiment. The amounts of the outer and inner radiuses of curvature Rc and Rc' are larger than those of the outer and inner radiuses of curvature R2 and R2' of the tube head 17 in the first embodiment and those of the outer and inner radiuses of curvature R2 and R2' of the tube head 17' in the second embodiment.

The faceplate 109 has the same shape and size as the external shape and size of the cross-section of the tube 112. That is, the faceplate 109 is a plate having a substantially square shape. The faceplate 109 includes: four rounded or curved corners 109*b* that are curved with the radius of curvature Rc; and four side surfaces 109*a* that connect each two adjacent rounded corners 109*b* at a length equal to the outer size Wc. The effective photoelectric area K is defined on the lower surface 109*d* of the faceplate 109 at a region inside the tube 112. A photocathode 120 is formed over the effective photoelectric area K.

The magnetic shield 40 is provided covering the outer periphery of a lower portion of the tube 112. The magnetic shield 40 includes the high magnetic permeability material layer 42 and the resin coating layer 44 similarly to that of the first embodiment.

Next will be described, with reference to FIGS. 15 to 17, a radiation detector 150 of the comparative example that employs the above-described multi-anode type photomultiplier tube 101.

In the radiation detector 150, the scintillator matrix 52 is bonded to the faceplate 109 of the multi-anode type photomultiplier tube 101, similarly to the radiation detector 50 of the first embodiment. The multi-anode type photomultiplier tube 101 has the construction that is described with reference to FIGS. 13 and 14, but the internal construction of the multi-anode type photomultiplier tube 101 is not shown in FIG. 16 for clarity purposes.

Figure 15:
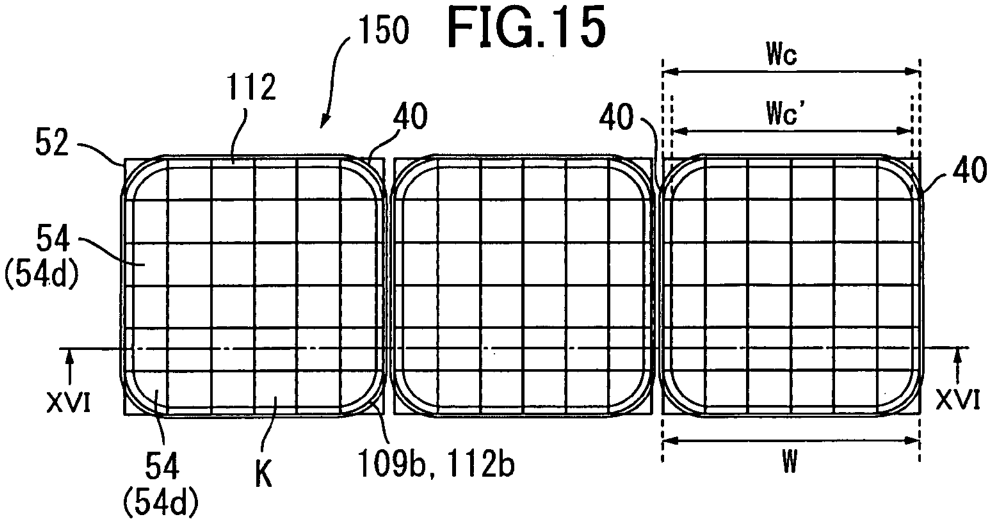
FIG. 15 is a schematic plan view showing an arrangement, in which several radiation detectors of a comparative example are arranged.
Figure 16:
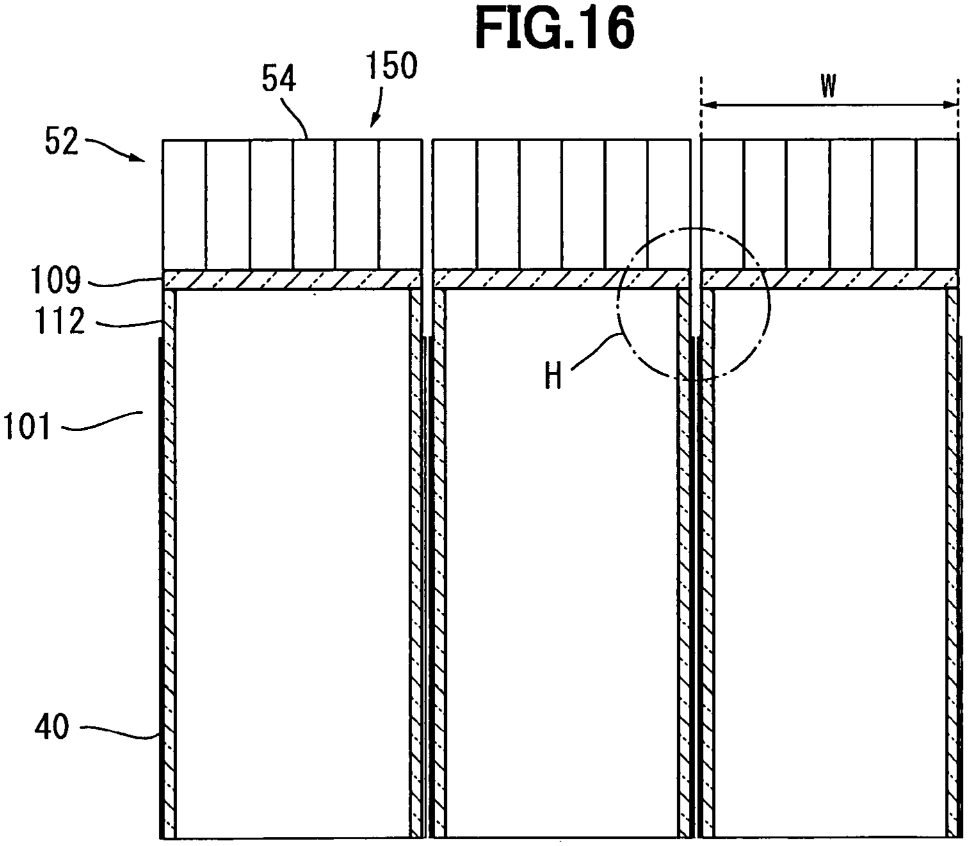
FIG. 16 is a sectional view taken along the line XVI-XVI of FIG. 15.

FIG. 15 is a view similar to FIG. 9, and schematically shows a positional relationship between the output surfaces 54*d* of the thirty-six scintillators 54 constituting the scintillator matrix 52 and the effective photoelectric area K of the photomultiplier tube 101. As shown in FIG. 15, similarly to that of the first embodiment, the periphery-located scintillators 54 in the scintillator matrix 52 face the outer periphery of the tube 112 through the outer periphery of the faceplate 109. In particular, the corner-located scintillators 54 in the scintillator matrix 52 face the corners 112*b* of the tube 112 through the corners 109*b* of the faceplate 109.

It is noted that the scintillator matrix 52 has the external size W (39 mm, for instance), and the magnetic shield 40 has the thickness M.

The outer sizes Wc of the faceplate 109 and of the tube 112 are equal to the size W of the scintillator matrix 52. The inner size Wc' of the tube 112 is smaller than the outer size Wc by twice of the thickness Tc of the tube 112. In other words, the inner size Wc' is smaller than the size W by "2×Tc".

Figure 17:
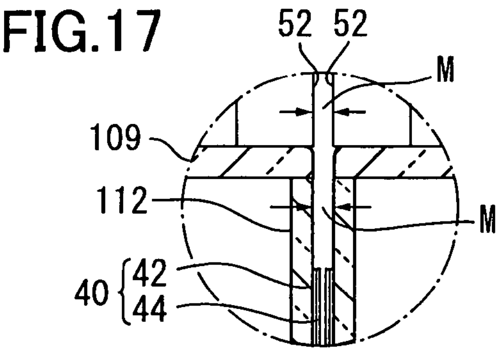
FIG. 17 is an enlarged view of a portion H shown in FIG. 16.

When the radiation detectors 150 having the above-described sizes are arranged with the magnetic shields 40 of each two adjacent radiation detectors 150 contacting with each other, each two adjacent tubes 112 are spaced away from each other by a distance that is equal to the thickness M of the magnetic shield 40 as shown in FIG. 17. This results in that a dead space with a size of (M−S) is generated. This is because it is sufficient that each two adjacent tubes 112 be spaced away from each other by the minimum distance S. Additionally, the outer sizes Wc of the faceplate 109 and of the tube 112 are equal to the size W of the scintillator matrix 52. The difference between the inner size Wc' of the tube 112 and the size W of the scintillator matrix 52 is relatively large. Therefore, as shown in FIG. 15, the output surface 54*d* of each periphery-located scintillator 54 has only a relatively small area that properly faces the effective photoelectric area K inside the tube 112. Additionally, the radiuses of curvature Rc and Rc' of the corners 112*b* are relatively large. Accordingly, the output surface 54*d* of each corner-located scintillator 54 has only a relatively small area that properly faces the effective photoelectric area K inside the corresponding corner 112*b*.

Next will be described, with reference to FIGS. 18A-18C and 19A-19C, advantages attained by the first embodiment and the second embodiment in comparison with the comparative example.

It is noted that the amount of the outer size W2 of the tube head 17 in the first embodiment and the amount of the outer size W2 of the tube head 17' in the second embodiment are larger than the amount of the outer size Wc of the tube 112 in the comparative example. The amount of the inner size W2' of the tube head 17 in the first embodiment and the amount of the inner size W2' of the tube head 17' in the second embodiment are larger than the amount of the inner size Wc' of the tube 112 in the comparative example. The amounts of the radiuses of curvature R2 and R2' in the corners 17*b* of the tube head 17 in the first embodiment and the amounts of the radiuses of curvature R2 and R2' in the corners 17*b* of the tube head 17' in the second embodiment are smaller than the amounts of the radiuses of curvature Rc and Rc' in the corners 112*b* of the tube 112 in the comparative example.

Figure 18A:
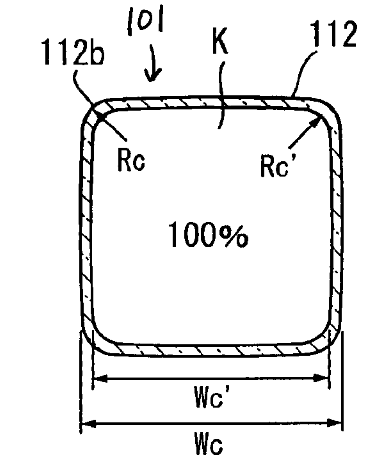
FIGS. 18A-18C are explanatory diagrams showing effective photoelectric areas, which are attained by the multi-anode type photomultiplier tubes of the comparative example, the first embodiment, and the second embodiment, respectively, when the sizes of the tube heads of the first and second embodiments are larger than the size of the tube of the comparative example and the radiuses of curvature in the tube heads of the first and second embodiments are smaller than those in the tube of the comparative example.
Figure 18B:
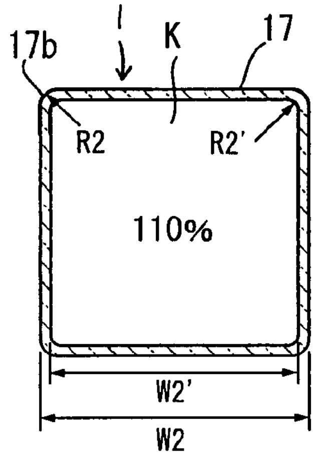
Figure 18C:
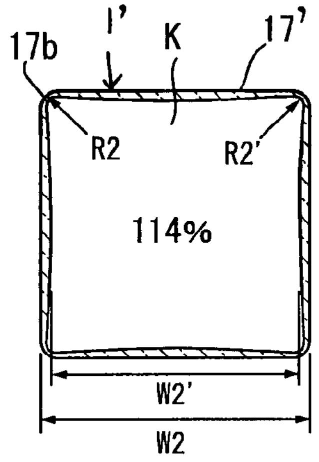

FIG. 18A shows the effective photoelectric area K obtained by the tube 112 of the comparative example. It is now assumed that the effective photoelectric area K obtained by the tube 112 has a value of "100%". FIG. 18B shows the effective photoelectric area K obtained by the tube head 17 of the first embodiment. The effective photoelectric area K obtained by the tube head 17 increases up to 110%. FIG. 18C shows the effective photoelectric area K obtained by the tube head 17' of the second embodiment. The effective photoelectric area K obtained by the tube head 17' of the second embodiment increases further up to 114%.

Thus, the effective photoelectric area K obtained by the tube head 17 of the first embodiment is larger than that obtained by the tube 112 of the comparative example. The effective photoelectric area K obtained by the tube head 17' of the second embodiment is larger than that of the tube head 17 of the first embodiment.

Figure 19A:
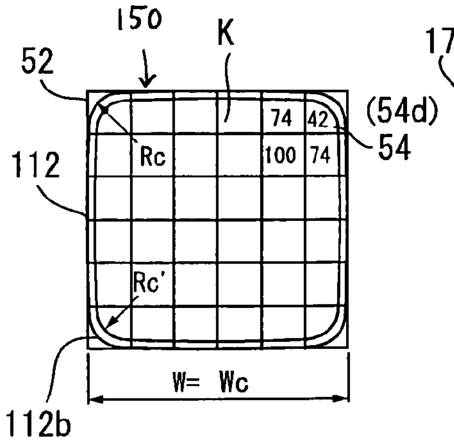
FIGS. 19A-19C are explanatory diagrams showing positional relationships between scintillator matrices and the effective photoelectric areas in the radiation detectors of the comparative example, the first embodiment, and the second embodiment, respectively, when the sizes of the tube heads of the first and second embodiments are larger than the size of the tube of the comparative example and the radiuses of curvature in the tube heads of the first and second embodiments are smaller than those in the tube of the comparative example.
Figure 19B:
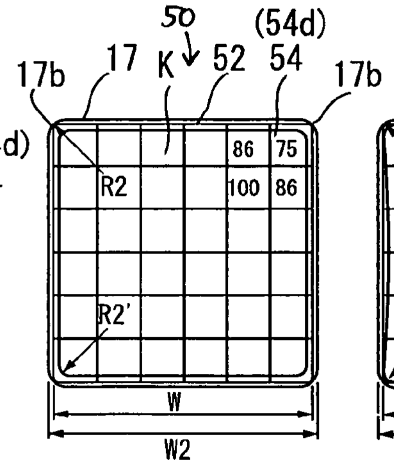
Figure 19C:
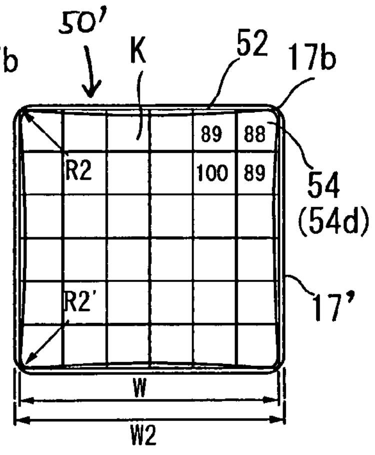

FIG. 19A shows a positional relationship between the output surfaces 54*d* of the scintillators 54 in the scintillator matrix 52 and the effective photoelectric area K of FIG. 18A. FIG. 19B shows a positional relationship between the output surfaces 54*d* and the effective photoelectric area K of FIG. 18B. FIG. 19C shows a positional relationship between the output surfaces 54*d* of the scintillators 54 and the effective photoelectric area K of FIG. 18C.

It is noted that a "scintillator effective area ratio" is defined for the output surface 54*d* of each scintillator 54 as a ratio (percentage) of the area of a part of the output surface 54*d* that faces the effective photoelectric area K with respect to the entire area of the output surface 54*d*. Each of FIGS. 19A-19C indicates the scintillator effective area ratio at each of four scintillators 54 that are located in the vicinity of one corner of the scintillator matrix 52.

As apparent from FIG. 19A, according to the comparative example, the periphery-located scintillators 54 have the scintillator effective area ratios of values lower than that of the center-located scintillator 54. This is because the outer size Wc of the tube 112 is equal to the size W of the scintillator matrix 52. Accordingly, the tube head 112 provides different sensitivities onto the center portion and the outer peripheral portion of the scintillator matrix 52. Especially, the corner-located scintillator 54 has the scintillator effective area ratio of a value significantly lower than that of the center-located scintillator 54. This is because the radiuses of curvature Rc and Rc' of the corners 112*b* are relatively large. Accordingly, the tube 112 provides significantly different sensitivities onto the corner portion and the center portion of the scintillator matrix 52.

As shown in FIG. 19B, the scintillator effective area ratios at the periphery-located scintillators 54 in the first embodiment are greater than those in the comparative example of FIG. 19A. This is because the outer size W2 of the tube head 17 is larger than the outer size W of the scintillator matrix 52. Especially, the scintillator effective area ratio at the corner-located scintillator 54 in the first embodiment is significantly greater than that in the comparative example of FIG. 19A. This is because the radiuses of curvature R2 and R2' at the corners 17*b* of the first embodiment are smaller than the radiuses of curvature Rc and Rc' at the corners 112*b* of the comparative example. Therefore, the tube head 17 of the first embodiment attains a substantially uniform sensitivity onto the entire portion of the scintillator matrix 52.

As shown in FIG. 19C, according to the second embodiment, the scintillator effective area ratios are further enhanced at those scintillators 54 that are located in the vicinity of the rounded corner 17*b*. Therefore, the tube head 17' of the second embodiment attains a more uniform sensitivity onto the entire portion of the scintillator matrix 52 relative to the tube head 17 of the first embodiment.

Thus, according to the first and second embodiments, all the scintillators 54 have the scintillator effective area ratios of substantially uniform large values. Accordingly, the photocathode 20 is capable of receiving scintillation light from all the scintillators 54 at substantially uniform ratios and is capable of detecting radiation with substantially uniform sensitivity.

It is now assumed that the multi-anode type photomultiplier tube 101 of the comparative example is provided with no magnetic shield 40. It is also assumed that the amount of the outer size Wc of the tube 112 is equal to the amount of the outer size W2 of the tube head 17 of the first embodiment and to the amount of the outer size W2 of the tube head 17' of the second embodiment, and therefore is greater than the size W of the scintillator matrix 52 by an amount of (M−S). In this case, if the radiation detectors 150 of the comparative example are arranged with each two adjacent scintillator matrixes 52 being spaced apart from each other by the distance M similarly to the first embodiment, each two adjacent tubes 112 will be spaced away from each other by the minimum distance S.

With reference to FIGS. 20A-20C and 21A-21C, next will be described advantages obtained by the first embodiment and the second embodiment in comparison with the comparative example under the following conditions: The amount of the outer size Wc of the comparative tube 112 and the amounts of the outer sizes W2 of the tube heads 17, 17' of the first embodiment and the second embodiment are equal to each other, and are greater than the size W of the scintillator matrix 52. The amount of the inner size Wc' of the comparative tube 112 is equal to the amounts of the inner sizes W2' of the tube heads 17, 17' of the first and second embodiments. The amounts of the radiuses of curvature Rc and Rc' at the corners 112*b* of the comparative tube 112 are larger than the amounts of the radiuses of curvatures R2 and R2' at the corners 17*b* of the tube heads 17, 17' of the first embodiment and the second embodiment.

Figures 20A, 20B, 20C:
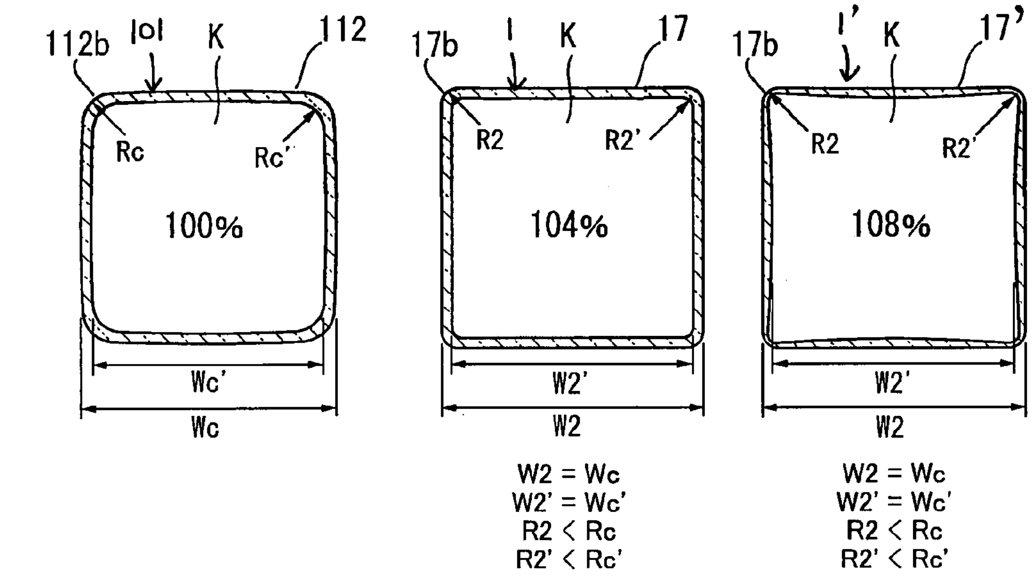
FIGS. 20A-20C are explanatory diagrams respectively showing effective photoelectric areas, which are attained by the multi-anode type photomultiplier tubes of the comparative example, the first embodiment, and the second embodiment, respectively, when the sizes of the tube heads of the first and second embodiments are equal to the size of the tube of the comparative example but the radiuses of curvature in the tube heads of the first and second embodiments are smaller than those in the tube of the comparative example.

FIG. 20A shows the effective photoelectric area K obtained by the comparative tube 112. It is now assumed that the effective photoelectric area K obtained by the tube 112 has a value of "100%". FIG. 20B shows the effective photoelectric area K obtained by the tube head 17 of the first embodiment. The effective photoelectric area K obtained by the tube head 17 increases up to 104%. FIG. 20C shows the effective photoelectric area K obtained by the tube head 17' of the second embodiment. The effective photoelectric area K obtained by the tube head 17' increases further up to 108%.

Figures 21A, 21B, 21C:
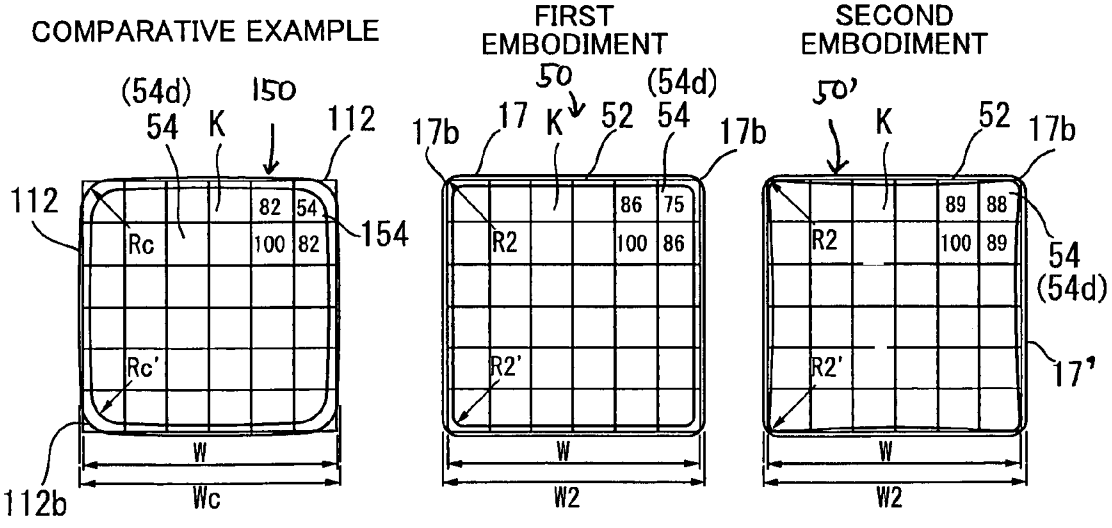
FIGS. 21A-21C are explanatory diagrams showing positional relationships between scintillator matrices and the effective photoelectric areas in the radiation detectors of the comparative example, the first embodiment, and the second embodiment, respectively, when the sizes of the tube heads of the first and second embodiments are equal to the size of the tube of the comparative example but the radiuses of curvature in the tube heads of the first and second embodiments are smaller than those in the tube of the comparative example.

FIG. 21A shows a positional relationship between the output surfaces 54*d* of the scintillators 54 in the scintillator matrix 52 and the effective photoelectric area K of FIG. 20A. FIG. 21B shows a positional relationship between the output surfaces 54*d* of the scintillators 54 and the effective photoelectric area K of FIG. 20B. FIG. 21C shows a positional relationship between the output surfaces 54*d* of the scintillators 54 and the effective photoelectric area K of FIG. 21C. As apparent from FIGS. 21A-21C, the scintillator effective area ratios obtained in the vicinity of the corners 17*b* of the tubes 17 and 17' of the first embodiment and the second embodiment are greater than those obtained in the vicinity of the corners 112*b* in the tube 112 of the comparative example.

While the invention has been described in detail with reference to the specific embodiments thereof, it would be apparent to those skilled in the art that various changes and modifications may be made therein without departing from the spirit of the invention.

For example, the shape of the faceplate 9 and the cross-sectional shape of the side tube 11 are not limited to squares so long as these shapes are substantially quadrangular. For instance, the shape of the faceplate 9 and the cross-sectional shape of the side tube 11 may be modified into substantially rectangular shapes.

The thickness of the tube head 17 may be thinner than the thickness of the tube main body 13.

In the first embodiment, the tube head 17 may be modified so that the thickness T2 in the rounded corners 17*b* is slightly smaller than that in the planer sides 17*a* and so that the inner radius of curvature R2' has a value slightly smaller than the outer radius of curvature R2. Similarly, the tube main body 13 may be modified so that the thickness T1 in the rounded corners 13*b* is slightly smaller than that in the planer sides 13*a* and so that the inner radius of curvature R1' has a value slightly smaller than the outer radius of curvature R1.

The multi-anode type photomultiplier tubes 1, 1' may be modified into any type other than the two-by-two type by including a desired number of dynode arrays and a desired number of anode electrodes.

Each dynode array may be modified into any type other than the linear focus type.

The plurality of radiation detectors 50, 50' may be arranged in a two-dimensional manner or a three-dimensional manner instead of the one-dimensional manner.

The multi-anode type photomultiplier tubes 1, 1' may be provided with no magnetic shields 40.

The multi-anode type photomultiplier tubes 1, 1' and the radiation detectors 50, 50' can be widely used in a positron emission tomography of the medical field, and can be used in many other fields such as other radiation detection fields and photodetection fields. The multi-anode type photomultiplier tubes 1, 1' may be used for any devices other than the radiation detector 50, 50'.

What is claimed is:

1. A multi-anode type photomultiplier tube comprising:

a faceplate made from glass and having a first surface and a second surface opposite to each other;

a hollow side tube made from glass, the side tube extending along a tube axis that is substantially perpendicular to the faceplate, the side tube including:

a tube main body having a substantially quadrangular prismatic hollow shape, the tube main body extending along the tube axis by a first length, the tube main body having a first size of cross section substantially perpendicular to the tube axis, the cross section having four first corners, each first corner being curved with a first radius of curvature;

a tube head having a substantially quadrangular prismatic hollow shape, the tube head extending along the tube axis by a second length, the tube head having a second size of cross section substantially perpendicular to the tube axis, the cross section having four second corners, each second corner being curved with a second radius of curvature, the second length being shorter than the first length, the second size being larger than the first size, the second radius of curvature being smaller than the first radius of curvature, the tube head being connected to the first surface of the faceplate; and a funnel-shaped connection neck connecting the tube head to the tube main body coaxially along the tube axis;

a photocathode that is provided on the first surface of the faceplate at its area inside the tube head and that emits photoelectrons in response to incidence of light on the faceplate from the second surface;

a plurality of electron multiplying portions provided inside the tube main body in one-to-one correspondence with a plurality of regions on the photocathode; and a plurality of anode electrodes provided inside the tube main body in one-to-one correspondence with the plurality of electron multiplying portions.

2. The multi-anode type photomultiplier tube according to claim 1, wherein the tube head includes an outer peripheral surface and an inner peripheral surface, the outer peripheral surface connects each two adjacent second corners with a substantially straight line, and the inner peripheral surface connects each two adjacent second rounded corners with a substantially straight line.

3. The multi-anode type photomultiplier tube according to claim 1, wherein the tube head includes an outer peripheral surface and an inner peripheral surface, the outer peripheral surface connects each two adjacent second corners with a substantially straight line, the inner peripheral surface connects each two adjacent second corners with a curved line, and the inner peripheral surface gradually approaches the outer peripheral surface from a substantially central position between the each two adjacent second corners towards the each two adjacent second corners.

4. The multi-anode type photomultiplier tube according to claim 1, further comprising:

a converging electrode plate that converges the photoelectrons emitted from the photocathode; and a partition plate that divides an electron converging space defined between the photocathode and the converging electrode plate into a plurality of segment-spaces corresponding to the plurality of regions on the photocathode, each electron multiplying portion receiving photoelectrons that enter the corresponding segment-space and that is converged by the converging electrode plate in the corresponding segment-space.

5. The multi-anode type photomultiplier tube according to claim 4, wherein the partition plate extends from the tube head into the tube main body through the funnel-shaped connection neck in the side tube, wherein the converging electrode plate, the plurality of electron multiplying portions, and the plurality of anode electrodes are arranged in the tube main body, and further comprising a magnetic shield that is provided on an outer periphery of the tube main body.

6. The multi-anode type photomultiplier tube according to claim 1, further comprising a scintillator matrix that includes a plurality of scintillators that are arranged in a two-dimensional matrix manner, each scintillator having an output surface, each scintillator generating scintillation light in accordance with radiation incident on the scintillator and outputting the scintillation light from the output surface, the second surface of the faceplate facing the output surfaces of all the scintillators in the scintillator matrix.

7. A multi-anode type photomultiplier tube comprising:

a faceplate made from glass;

a hollow side tube made from glass and joined to one main surface of the faceplate, the side tube extending along a tube axis that is substantially perpendicular to the faceplate;

a photocathode that emits photoelectrons according to light incident on the faceplate, the photocathode being provided in an area inside the side tube on the one main surface of the faceplate; and a plurality of electron multiplying sections and a plurality of anode electrodes, which are provided inside the side tube and which correspond to a plurality of areas on the photocathode, the side tube including a tube head, a funnel-shaped connection neck, and a tube main body which are formed integrally with one another along the tube axis, the tube main body having a substantially quadrangular prismatic hollow shape, the tube main body extending along the tube axis by a first length, the tube main body having a first size of cross section substantially perpendicular to the tube axis, the cross section having four first corners, each of the four first corners being curved with a first radius of curvature, the tube head having a substantially quadrangular prismatic hollow shape, the tube head extending along the tube axis by a second length, the tube head having a second size of cross section substantially perpendicular to the tube axis, the cross section having four second corners, each of the four second corners being curved with a second radius of curvature, the second length being shorter than the first length, the second size being larger than the first size, the second radius of curvature being smaller than the first radius of curvature, the funnel-shaped connection neck connecting the tube head to the tube main body coaxially, the tube head being connected to the one main surface of the faceplate, the photocathode being provided on an area inside the tube head portion on the one main surface of the faceplate, and the plurality of electron multiplying sections and the plurality of anode electrodes being provided inside the tube main body.

8. A radiation detector comprising:

a scintillator matrix that includes a plurality of scintillators arranged in a two-dimensional matrix manner, each scintillator having an output surface, each scintillator generating scintillation light in accordance with radiation incident on the scintillator and emitting the scintillation light from the output surface; and a multi-anode type photomultiplier tube that detects the scintillation light emitted from each scintillator of the scintillator matrix, the multi-anode type photomultiplier tube including:

a faceplate made from glass;

a hollow side tube made from glass and joined to one main surface of the faceplate, the side tube extending along a tube axis that is substantially perpendicular to the faceplate, another main surface of the faceplate facing the output surfaces of all the plurality of scintillators in the scintillator matrix;

a photocathode that emits photoelectrons according to scintillation light incident on the faceplate, the photocathode being provided on the one main surface of the faceplate at its area inside the side tube; and a plurality of electron multiplying units and a plurality of anode electrodes, which are provided inside the side tube and which correspond to a plurality of areas on the photocathode, the side tube including a tube head, a funnel-shaped connection neck, and a tube main body integrally along the tube axis, the tube main body having a substantially quadrangular prismatic hollow shape, the tube main body extending along the tube axis by a first length, the tube main body having a first size of cross section substantially perpendicular to the tube axis, the cross section having four first corners, each of the four first corners being curved with a first radius of curvature, the tube head having a substantially quadrangular prismatic hollow shape, the tube head extending along the tube axis by a second length, the tube head having a second size of cross section substantially perpendicular to the tube axis, the cross section having four second corners, each of the four second corners being curved with a second radius of curvature, the second length being shorter than the first length, the second size being larger than the first size, the second radius of curvature being smaller than the first radius of curvature, the funnel-shaped connection neck connecting the tube head to the tube main body coaxially, the tube head being joined to the one main surface of the faceplate, the photocathode being provided on the one main surface of the faceplate at its area inside the tube head, and the plurality of electron multiplying units and the plurality of anode electrodes being provided inside the tube main body.

* * * * *